(12) United States Patent
Bindrim et al.

(10) Patent No.: US 10,298,750 B2
(45) Date of Patent: May 21, 2019

(54) TELECOMMUNICATION NETWORKS FOR CONTENT DELIVERY AND LAWFUL INTERCEPTION, CONTENT FILTERING AND FURTHER CONTENT SERVICES USING A SAVI PLATFORM

(71) Applicant: VODAFONE IP LICENSING LIMITED, Newbury, Berkshire (GB)

(72) Inventors: Walter Gottfried Bindrim, Newbury (GB); Ahmed Fouad Adel Ahmed Hafez, Newbury (GB)

(73) Assignee: VODAFONE IP LICENSING LIMITED, Newbury, Berkshire (GB)

( * ) Notice: Subject to any disclaimer, the term of this patent is extended or adjusted under 35 U.S.C. 154(b) by 0 days.

(21) Appl. No.: 15/035,200

(22) PCT Filed: Nov. 21, 2013

(86) PCT No.: PCT/GB2013/053074
§ 371 (c)(1),
(2) Date: May 6, 2016

(87) PCT Pub. No.: WO2015/075408
PCT Pub. Date: May 28, 2015

(65) Prior Publication Data
US 2016/0269550 A1    Sep. 15, 2016

(51) Int. Cl.
*H04M 3/22* (2006.01)
*H04L 29/06* (2006.01)
(Continued)

(52) U.S. Cl.
CPC ........ *H04M 3/2281* (2013.01); *H04L 63/306* (2013.01); *H04L 67/02* (2013.01);
(Continued)

(58) Field of Classification Search
CPC .... H04M 3/2281; H04L 63/306; H04L 67/02; H04W 24/08; H04W 28/08; H04W 80/04; H04W 76/04
See application file for complete search history.

(56) References Cited

U.S. PATENT DOCUMENTS

| 2010/0015956 A1* | 1/2010 | Qu ........................ H04N 7/163 455/414.1 |
| 2011/0141887 A1* | 6/2011 | Klein ...................... H04W 4/00 370/230 |
| 2014/0359048 A1* | 12/2014 | Vikberg ................ G06Q 30/02 709/213 |

FOREIGN PATENT DOCUMENTS

| EP | 2 315 412 | 4/2011 |
| EP | 2 538 719 A2 | 12/2012 |

(Continued)

OTHER PUBLICATIONS

International Search Report for PCT/GB2013/053074 dated Sep. 16, 2014.

(Continued)

*Primary Examiner* — Mohammad S Anwar
(74) *Attorney, Agent, or Firm* — Workman Nydegger

(57) ABSTRACT

A mobile telecommunications network includes a core network (2020) having content processing means (2060, 2070) operable to provide a core network service relating to content, and a radio access network (700, 2003) having radio means for wireless communication with terminals (10) registered with the network, wherein the radio access network (700, 2003) includes a local source of content (1100). The telecommunications network is arranged to: deliver content from the local source of content (1100) to the terminal (10), to send to the core network (2020) an indication of the content delivered from the local source of content (1100) to the terminal (10), to obtain a copy of the content of the local (Continued)

source of content (1100) provided to the terminal (10), and to provide the content processing means (2060, 2070) core network service in relation to the copy of the content of the local source.

14 Claims, 15 Drawing Sheets

(51) Int. Cl.
*H04L 29/08* (2006.01)
*H04W 24/08* (2009.01)
*H04W 28/08* (2009.01)
*H04W 76/20* (2018.01)
*H04W 80/04* (2009.01)

(52) U.S. Cl.
CPC ............ *H04W 24/08* (2013.01); *H04W 28/08* (2013.01); *H04W 76/20* (2018.02); *H04W 80/04* (2013.01)

(56) References Cited

FOREIGN PATENT DOCUMENTS

| WO | 2013043094 A1 | 3/2013 |
|----|---------------|--------|
| WO | WO 2013/164474 | 11/2013 |

OTHER PUBLICATIONS

Examination Report issued in European Application No. 13798382.1 dated Jan. 24, 2018.

\* cited by examiner

TELECOMMUNICATION NETWORKS FOR CONTENT DELIVERY AND LAWFUL INTERCEPTION, CONTENT FILTERING AND FURTHER CONTENT SERVICES USING A SAVI PLATFORM

CROSS REFERENCE TO RELATED APPLICATIONS

This application is a U.S. Nationalization of PCT Application Number PCT/GB2013/053074, filed on Nov. 21, 2013, the entireties of which are incorporated herein by reference.

FIELD OF THE INVENTION

The present invention relates to a mobile telecommunications network including a core network having content processing means operable to provide a core network service relating to content, and a radio access network having radio means for wireless communication with terminals registered with the network, wherein the radio access network includes a local source of content. The present invention also relates to a corresponding method.

BACKGROUND

Recently, a dramatic rise in sales of both smart-phones and laptop data cards has resulted in a substantial increase in the amount of data communications passing through mobile telecommunications networks. This volumetric increase can also be attributed to enhancements made to the capabilities of the networks. In fact it has been reported that mobile data growth grew 30 percent over the course of the second quarter of 2009. The most popular use for mobile data was HTTP browsing, although usage of HTTP streaming is growing considerably. Other mobile data uses include HTTP downloading and Peer-to-Peer (P2P) activities such as file sharing.

This ability to use the cellular networks for mobile data services, such as Internet browsing is resulting in subscribers treating their mobile networks in much the same way as they treat their fixed networks. That is, users are tending to expect the same service from the Internet, irrespective of their access method. However, mobile networks have a more restricted capacity and are more costly to operate, as compared to fixed networks.

In this regard, from the network operator's viewpoint, as the mobile broadband traffic volume carried over 2G, 3G, HSPA (High Speed Packet Access) and 4G networks continues to grow, the cost of supporting this data volume is becoming more and more expensive based on the current network architecture and deployments. This cost differential is exacerbated by one of the current business models being utilised, whereby operators charge a flat rate for unlimited amounts of data.

The increased usage is also unfortunately likely to result in an increase of data traffic jams, and hence a degradation of service for mobile users if not properly managed.

It has been proposed to control data-heavy users by "choking" the bandwidth available to them when a maximum data volume limit is exceeded. Whilst this addresses the problem on an individual level, it does not address the network capacity problem as a whole.

It is therefore apparent that mobile broadband is at a crossroads as networks and business models are strained by bandwidth demand that is unmatched by revenue generation.

These problems will only get worse with moves to position mobile data as a replacement for fixed DSL (Digital Subscriber Line) access and with the advent of higher radio access speeds with 4G LTE/SAE (Long Term Evolution/System Architecture Evolution) network. A large percentage of this traffic will consist of data which is destined for the public Internet, a significant proportion of which mobile operators will not be able to add value to, despite carrying the data on their own backhaul transport, core transport or cellular core infrastructure.

In addition to the problems discussed above, conventional mobile telephone communications networks have architectures that are hierarchical and traditionally expensive to scale. The hardware and software implementation of many network elements, such as the BTS, routers, BSC/RNC etc are proprietary: devices of one manufacturer often do not interface with devices from another manufacturer. This makes it difficult to introduce new capabilities into the network as a different interface will be required for devices from each manufacturer. Further, conventional base stations are not capable of intelligent local routing or processing. Furthermore, the capacity of existing networks is not always used effectively. For example, many cell sites are under used, whilst others are heavily used.

The current cellular network architecture has the following disadvantages:—
- Hierarchical and expensive to scale
- Backhaul is a major problem
- Proprietary platforms: BTS, BSC/RNCetc
- Closed nodes and interfaces
- Very limited application or customer awareness (except for QoS priority)
- No intelligent local routing or processing
- Inefficient use of installed capacity There is therefore a need to overcome or ameliorate at least one of the problems of the prior art. In particular there is a need to address the needs of both the network operators and the users in improving the provision of mobile broadband data services.

EP2315412 describes the introduction of a novel platform at the network edge. To open the radio access part a "General Purpose Hardware Platform" may be implemented at the network edge. This may allow operators to split the functions of an Radio Network Controller (RNC) and/or a (e)NodeB between hardware and software. As a consequence operators have the capability to place applications and content directly at the edge of the network.

Despite the capability to place content and applications at the edge, such as games, M2M, CDN or cached content, mandatory core network functions, such as Lawful Intercept (LI), Adult Content Filter (ACF), charging or others, must still be supported in the core network.

As content and applications located at different radio locations require the same services and functions located in the core network, the mobile operator has to offer a service parity if a user or machine gets served e.g. content from the e.g. (e)NodeB or the core network. This is seen as one of the major issues in bringing content and applications to the radio locations. The proposed solution should preferably offer functions and services offered also by the core and Gi networks to the customers.

A key capability such network enhancements could provide is data caching; when pushed to the edge of the network, data caching capabilities can reduce network traffic, and improve latency of data for terminal devices such as mobile handsets.

Core network services require access to network data to perform, e.g., Lawful Interception (LI), and charging or billing. LI is obtaining communications network data pursuant to lawful authority for the purpose of analysis or evidence. Such data can consist of signalling or network management information, or the content of the communications. When intelligence is pushed to the edge of the network, access to this network data becomes difficult as some data will only move between network components at the edge. In this scenario, some network data will never enter the core of the network where monitoring for such services is traditionally done. Therefore a solution is required to support core services at the edge of the network.

Core network services often have other requirements that need to be taken into consideration. For example, avoiding detection of LI is a mandatory requirement to meet legal obligations. LI detection must not be possible by anyone, including end users or compromised employees, with or without direct or indirect access to relevant data. Some details of LI requirements can be found in the following documents, which are fully incorporated herein by reference:

3GPP TS 33.106, 3G security; Lawful Interception requirements
  3GPP TS 33.107, 3G security; Lawful interception architecture and functions
  3GPP TS 33.108, 3G security; Handover interface for Lawful Interception (LI)

It is understood that LI warrants require intercept related information (IRI) by Law Enforcement Agencies (LEA's). An object of an embodiment provides core network services such as LI with access to the original or cached IRI content; the flow of data such as content communication (CC) in LTE and 3G Core Control Plane may be unchanged with the introduction of edge-based intelligence in the communications network.

The following know arrangements are disclosed in EP2315412.

Key elements of a 3G mobile telecommunications network, and its operation, will now briefly be described with reference to FIG. 1.

Each base station (e.g. (e)NodeB 1 or Femto 2) corresponds to a respective cell of the cellular or mobile telecommunications network and receives calls from and transmits calls to a mobile terminal (not shown) in that cell by wireless radio communication in one or both of the circuit switched or packet switched domains. Here NodeB (3G) or eNodeB (4G—LTE) have been considered but should be just called NodeB for harmonisation. The mobile terminal may be any portable telecommunications device, including a handheld mobile telephone, a personal digital assistant (PDA), machine to machine device (M2M) or a laptop computer equipped with a network access datacard.

The NodeB 1 or Femto 2 can be considered to comprise two main parts: a radio frequency part (radio unit) and a baseband part. The radio frequency part handles the transmission of radio frequency signals between the antenna of the NodeB 1 or Femto 2 and the mobile terminal, and for converting radio frequency signals into digital baseband signals (and vice versa). The baseband part is responsible for controlling and managing the transmission of the baseband signals to other components of the mobile telecommunications network.

In a macro 3G network, the Radio Access Network (RAN) comprises NodeBs and Radio Network Controllers (RNCs). The NodeB is the function within the 3G network that provides the physical and transport radio link between the mobile terminal (User Equipment, UE) and the network. The NodeB performs the transmission and reception of data wirelessly across the radio interface, and also applies the codes that are necessary to describe channels in a WCDMA system. The RNC is responsible for control the Node Bs that are connected to it. The RNC performs Radio Resource Management (RRM), some of the mobility management functions and is the point where encryption is done before user data is sent to and from a mobile terminal. The RNC connects to the Circuit Switched Core Network through a Media Gateway (MGW) (or MSC/MSS in case of R4 architecture) and to an SGSN (Serving GPRS Support Node) 5 in the Packet Switched Core Network. In FIG. 1, Node B 1 is controlled by RNC 3 across the Iub interface. An RNC may control more than one node B. For LTE the following nodes have to be considered: MME, S-GW, PDN-GW).

FIG. 1 also illustrates a Femto 3G RAN, with Femto 2 operating as the base station. Femto 2 is connected to an Access Gateway (AGW) (a.k.a Concentrator) 4 via an Iuh interface. Femto is an abbreviation of "femto-cells", and many other different names have been used, including home access points (HAPs), access points (APs) and femto-base stations, but all names refer to the same apparatus.

The radio link between the Femto 2 and the mobile terminal uses the same cellular telecommunication transport protocols as Node B 1 but with a smaller range—for example 25m. The Femto 2 appears to the mobile terminal as a conventional base station, so no modification to the mobile terminal is required for it to operate with the Femto 2. The Femto 2 performs a role corresponding to that of Node B 1 in the macro 3G RAN.

The Femto 2 would typically be configured to serve a home or office, in addition to GSM/UMTS/LTE networks. The WLAN could belong to the subscriber of the mobile terminal, or be an independently operated WLAN. The owner of Femto 2 can prescribe whether it is open or closed, whereby an open AP is able to carry communications from any mobile device in the GSM/UMTS/LTE network, and a closed AP is only able to carry communications from specific pre-assigned mobile devices.

Conventionally, in a 3G network (macro or Femto), the RANs are controlled by a mobile switching centre (MSC) and an SGSN (Serving GPRS Support Node) 5 of the core network. The MSC supports communications in the circuit switched domain, whilst the SGSN 5 supports communications in the packet switched domain—such as GPRS data transmissions. The SGSN is responsible for the delivery of data packets from and to the mobile terminals within its geographical service area. It performs packet routing and transfer, mobility management (attach/detach and location management), logical link management, and authentication and charging functions. A location register of the SGSN stores location information (e.g., current cell, current VLR) and user profiles (e.g., IMSI, address(es) used in the packet data network) of all mobile terminals registered with this SGSN. In FIG. 1, since the embodiment is concerned with data transmission, only the SGSN is illustrated as being in communication with RNC 3 and AGW 4, across the Iu interface. The RNC 3 typically has a dedicated (not shared) connection to its SGSN 5, such as a cable connection.

Communications between the AGW 4 and the SGSN 5 are preferably IP based communications, and may be, for example, transmitted over a broadband IP network. Further, the connection between the Femto and the AGW 4 may use the PSTN (Public Switched Telephone Network). Typically a DSL cable connects the AGW to the PSTN, and data is transmitted there-between by IP transport/DSL transport.

The Femto or AGW converts the cellular telecommunications transport protocols used between the mobile terminal and the Femto 2 to the appropriate IP based signalling. The Iuh interface is similar to RAP with some Femto extensions.

The femto 2 may be connected to the AGW by means other than a DSL cable and the PSTN network. For example, the femto 2 may be connected to the AGW by a dedicated cable connection that is independent of the PSTN, or by a satellite connection.

The SGSN 5 is in communication with the GGSN 6 (Gateway GPRS Support Node) across the Gn interface. The GGSN is responsible for the interworking between the GPRS network and external packet switched networks, e.g. the Internet. The GGSN enables the mobility of mobile terminals in the networks. It maintains routing necessary to tunnel the Protocol Data Units (PDUs) to the SGSN that service a particular mobile terminal. The GGSN converts the GPRS packets coming from the SGSN into the appropriate packet data protocol (PDP) format (e.g., IP or X.25) and sends them out on the corresponding packet data network. In the other direction, PDP addresses of incoming data packets are converted to the mobile network address of the destination user. The readdressed packets are sent to the responsible SGSN. For this purpose, the GGSN stores the current SGSN address of the user and their profile in its location register. The GGSN is responsible for IP address assignment and is the default router for the connected mobile terminal. The GGSN also performs authentication and charging functions. Other functions include IP Pool management and address mapping, QoS and PDP context enforcement.

In turn the GGSN 6 may route data via any applicable Value Added Service (VAS) equipment 7, before data is forwarded towards its intended destination via the Internet 8. As an example of the functionality of the VAS equipment, the traffic may be inspected for adult content before reaching the end-user if this user is under 18 years of age.

For billing purposes in particular, a PCRF (Policy and Charging Rules Function) apparatus 9 is also provided, in communication with the GGSN 6.

The SGSN 5, GGSN 6, VAS 7 and PCRF apparatus 9 comprise the core network of the mobile telecommunications network. The core also comprises further elements, such as the HLR is missing.

Mobile telecommunications networks have an active state of communication with their mobile terminals and an inactive/idle state of communication with their terminals. When in the active state, as the mobile terminals move between different cells of the network, the communication session is maintained by performing a "handover" operation between the cells. In the inactive/idle state, as a mobile terminal moves between different cells of the network the mobile terminal performs "cell reselection" to select the most appropriate cell on which to "camp" in order that the mobile terminal can be paged by the network when mobile terminating data is destined for that mobile terminal.

Conventionally, the mobile terminal or network determines whether a handover/cell reselection procedure should be triggered in dependence upon measurements of the radio signals of the cells in the region of the mobile terminal. A filter is applied to the signals (either by the network or by the mobile terminal) which calculates an average (e.g. arithmetical mean) value of these signals over a particular time period. The filtered/average values of the cells are then compared with each other or with a threshold value. In dependence upon these comparisons, cell reselection/handover related procedures are triggered. This cell reselection/handover process generally comprises taking radio signal measurements of neighbouring cells and comparing these to each other and to the radio signal of the current cell to determine which cell provides the best signal strength/quality. Handover/reselection to the best cell can then occur.

Generally calculations to determine whether to perform a handover from one base station to another base station are performed by the network, whereas calculations whether to perform cell reselection are performed by the mobile terminal.

Data in a mobile telecommunications network can be considered to be separated into "control plane" and "user plane". The control plane performs the required signalling, and includes the relevant application protocol and signalling bearer, for transporting the application protocol messages. Among other things, the application protocol is used for setting up the radio access bearer and the radio network layer. The user plane transmits data traffic and includes data streams and data bearers for the data streams. The data streams are characterised by one or more frame protocols specific for a particular interface. Generally speaking, the user plane carries data for use by a receiving terminal—such as data that allow a voice or picture to be reproduced—and the control plane controls how data are transmitted.

In addition to the elements and functions described above, mobile telecommunications networks also include facilities for transmitting SMS messages. SMS messages are transmitted over the control plane only (and not the user plane).

This architecture is what currently is being used to carry all packet data to and from mobile terminals. That is, in today's implementation of the Packet data architecture, user plane traffic traverses across all the network elements shown between the Node B or Femto on which the user is camped and the internet. That is, all data is directed from the applicable RAN through the core network components SGSN, GGSN and VAS before reaching the internet. All PS traffic accordingly follows the same path and therefore has the same network costs. All applications are processed on the client (on the mobile device) or on the server (which is connected to the internet), and the network core therefore acts like a bit-pipe in the current architecture. For data, where the mobile network operator cannot add any value by carrying it on its own backhaul transport, core transport or cellular core infrastructure (the core network), such as data destined for the public internet without required intervention from the core network, there is no benefit to routing this data via the core network.

However, a large percentage of this traffic can be handled in a more intelligent manner for example through content optimisation (Video & Web), content caching, or locally routed or directly routing content to the public Internet. All these techniques reduce the investment required by a mobile operator to carry the data on its own backhaul and core transport or cellular core infrastructure.

In order to offer low cost packet data, to support new services and to manage customer expectation, a step-change reduction in the end-to-end cost per bit is required.

Mobile operators want to reduce their packet data handling costs through alternate network architectures based on commoditised IT platforms, breaking away from the traditional architecture based on their voice legacy. These new network architectures overcome the Access architecture issues of today In order to successfully offer cheap packet data and be able to compete with the fixed broadband offers (flat fee) a solution is proposed which focuses on the reduction of the end-to-end cost per bit, especially for Internet access service.

This enables mobile operators to reduce packet data handling costs by means of an alternative network cost model architecture, which breaks out of the traditional network architecture and nodes and utilises lower cost transport networks to optimise the data flow.

In this regard, FIG. 2 shows a high level description of the architecture that may be adopted to deploy this on a 3G network. Such an architecture is described in EP2315412. Note: The proposed solution is also valid for 4G (LTE) networks.

According to this arrangement, novel "platforms" (control units/means, also referred to as "SAVi") 24, 25, 26 for performing functions such as caching, routing, optimisation and offload/return decision functionality are integrated into the network. This decision functionality may be incorporated in the radio architecture. In this regard, the platforms 24, 25, 26 may be incorporated into the NodeBs 1 (25), RNCs 3 (26) or exist as separate physical entities (24). It is these platforms 24, 25, 26 that, for example, determine the path of communications originating from the mobile terminals.

The exact placement of the platform 24, 25, 26 is not essential, and, for a macro 3G network, it can be placed at or between the Node Bs and the RNCs, and also between the RNCs and the SGSNs (or any combination thereof). It would also be possible to place the platform 24, 25, 26 close to the GGSN or P-GW.

In the 3G Macro network, the aim is to offload a high percentage of the macro network traffic from the core and transport (IuPS, Gn, etc) by diverting specific traffic type for certain user(s) class directly to the Internet.

Where the platform 24, 25 is located in the Node Bs (or on the Iub interface), it may be possible to redirect the data from all the remaining mobile network elements (e.g. the RNC, SGSN, GGSN and VAS for macro 3G), and sending the data directly to the Internet 8 if LI is not mandatory required. In a similar manner, where the platform 26 is located at the RNC (or on the Iu interface), it becomes possible to redirect the data from the SGSN 5, GGSN 6 and the VAS 7. The alternative data route is preferably a DSL using ADSL.

It is also preferable to aggregate the alternative data routes for each cell, where applicable. In this regard, each cell will have at least one RNC 3 and a plurality of NodeBs, so where the decision blocks are situated at or in the vicinity of the Node Bs, for instance, there will be a plurality of links which should ideally be aggregated before being passed to the Internet 8. At the point of this aggregation 42, there is preferably a further decision block which enables data to be returned to the legacy route. For instance, a new policy rule may have been implemented, which requires or enables previously offloaded data to be returned to the core network route. This new policy rule may be communicated to the return decision module by the core network policy module. In FIG. 2, this returning of data is only shown to the VAS 7, but the data may be returned to one or more of the other core network elements.

Each of the NodeBs 1 is connected to the mobile network core through a Point of Concentration (PoC) 27. All traffic from the NodeBs 1 which is to be routed through the core mobile network is routed to the PoC 27. This includes both user plane and control plane data. On the control plane level, the PoC 27 routes data to and from the SGSN 5 and the GGSN 6. Control data is also sent to and from other core network components, including the Lawful Interception Database (LI DB) 30, DNS Server 32, Policy Server 9 (including Charging rules and IT Network 9A) and Home Location Register/Home Subscriber Server (HLR/HSS) 36 (which contains subscriber and device profile and state information).

User plane data is transmitted by the PoC 27 to the SGSN 5 and the GGSN 6. From the GGSN 6, data is routed across a VAS 7 node to the Internet 8. In 3G this is the standard data path from the mobile terminals to the Internet.

To implement an advantageous feature, an alternative path on which to re-route certain data to the internet 8 is provided, whereby, each NodeB 1 and Femto 2 may be connected to a fixed line connection 40 (e.g xDSL) which is directly connected to the internet 8. These xDSL connections may be made directly to the NodeB and/or Femto or made to the NodeB/Femto via other components, such as the PoC 27. In FIG. 2, the xDSL Network 40 may be a third party network or may be a network owned or controlled by the owner of the mobile telecommunications network. By using such an alternative path, radio capacity, backhaul transport resource, core transport resource, cellular core network resources could be saved as well as improving performance and enhancing revenue for the mobile network operator in case Charging and LI are not needed.

As each Node B 1 and/or PoC 27 is associated with a platform 24, 25, 26, for each data packet request originating from a mobile terminal, a decision at the platform 24, 25, 26 is made as to whether the traffic may bypass the core mobile network entirely or may be passed into the core mobile network. The location at which the traffic is routed towards the internet is preferably at the platform 24, 25, 26; however, it may alternatively be routed out from the core network towards the internet at a different component. Traffic offloaded from the macro network is routed by the platform 26 to the xDSL network 40 by link 44 (the decision to offload this traffic may have been made at platform 24, 25 or 26—

In case Offload is e.g. legally allowed it would be preferably the Offload/Return decision is dependent upon the type of data or user. To exemplify this feature of the embodiment, FIG. 3 is a flow diagram showing the steps taken when deciding how to route the traffic in the architecture of FIG. 2. For instance, consider a NodeB receives a request to set up a data call from a user device which is camped on the NodeB at 300. Once the NodeB has identified the request as a data call and the type of traffic/user, rather than automatically routing the data traffic to the core network, the data request is held at the NodeB at 310 until a decision has been made as to how to route the data, in particular whether to offload the traffic directly to the internet or whether to return the data through the core mobile network. The signalling (control plane) for the connection may continue through the normal route while the user data traffic will be held at the NodeB, this is possible by virtue of the separate user and control planes, as shown in FIG. 2.

The decision as to whether or not to use the Core mobile Network to route the data traffic can be based on various aspects, particularly relating to the properties of the data being routed and/or status of the user routing the data.

The Mobile Network may add value to traffic by providing a number of services, such as compressing the user data to speed-up the data transfer while downloading (if this functionality is not already supported by the platforms 24, 25, 26). These different services can be broken up into groups and provided by different entities (e.g. this enables greater flexibility in the provision of the services, such as the mandated Internet Watch Foundation—IWF—requirement, which can only be supported by the mobile operator). The platforms 24, 25, 26 therefore make a decision on whether to service the data locally through caching, fetch the data from other node or from the internet via offload functionally or whether to route the traffic through the core network, based on the applicability of one or more of the services to the traffic. That is, platform 24, 25, 26 decides when data traffic requires one or more of the services and when it can do without them.

It should also be noted that these services are ones that could be provided without using the core network. These are services that add value to the customer, and which subscribers will pay for (explicitly or implicitly).

Referring again to FIG. 3, the platform 24, 25, 26 decides at 320 what to do with the traffic (from coming for the network/internet or orientated by the device). This decision may be made by interrogating certain servers or databases stored centrally within the core network which can compare the type of service, type of user etc with criteria which identifies the type of action shall be considered, e.g whether the traffic is suitable for offloading directly to the internet (at 330) from the NodeB or whether the traffic should be routed through the core (at 340). Examples of some of the considerations used in influencing the decision of whether to offload the traffic are discussed below in more detail. The implementation of this data offload technique needs to be carefully considered, as it places additional constraints on the network design.

The following is a non-exhaustive list of examples of challenges that have to be considered when implementing the data offload technique:
  a) maintaining Customer Services provided by the core network or otherwise;
  b) maintaining Network Services (e.g. Charging Rate Limiting/application control); and
  c) maintaining Regulatory Services (e.g. to enable Lawful Interception and Regulatory Content Filtering).

Some specific examples of Customer Services that can be taken into account by the offload decision module include:
  i) Parental Control: A service which customers subscribe to that filters content in order to shield children from unwanted websites and programs. Whether traffic from a given user needs to be filtered can be determined by a Common User Repository (CUR) lookup, where the CUR stores user profile information, such as whether the user is an adult or a child etc. If traffic needs to be filtered, then either the traffic cannot be offloaded or it may need to be filtered somewhere other than the core network.
  ii) Traffic Optimisation: Optimisation may be advantageous, especially for low bandwidth connections (2G). By looking at the Radio Access Type (RAT) and the International Mobile Equipment Identity (IMEI) it can be determined whether or not a subscriber needs these services. Where traffic optimisation is not required, the traffic may be offloaded
  iii) Marketing Proposition: The mobile network is typically setup to provide full mobility with acceptable Quality of Service (QoS). A further option could be to offer best effort QoS without guaranteed full mobility. As an example, for when a heavy user has exceeded their fair usage limit, their traffic could be designated as low priority traffic and offloaded.

The Network Services that can be taken into account by the offload decision module are typically those that the network operator needs to manage its network. Some examples include:
  i) Charging: The charging plan that a user subscribes to can be used to determine whether or not offload that user's data. For instance, it is most easily avoided when the customer has a flat rate plan. That is, users on flat rate plans do not need their usage tracked for charging purposes in real time and so can be offloaded onto the alternative route. For users who are roaming or whose charging plan depends upon usage, then, the operator/supplier needs to track their total usage in real-time, and so their data needs to be maintained on the core network route so that rate-limits and data usage can be accurately tracked and alarms/alerts activated when usage exceeds allowances. This is because, if this is not avoidable then Call Data Records (CDRs) need to be generated by the module for the real time charging.
  ii) Rate-limiting/application control: This is currently used to manage the traffic flow according to a certain usage policy. Excessive bandwidth usage or controlling P2P applications are common reasons to rate limit users. Therefore, where a user transmitting data is determined to be under a rate restriction (i.e. throttling) or the data they are transmitting has an application restriction (i.e. the application is blocked), then that data can be offloaded. This exceeded allowance information would typically be communicated to the decision module (24, 25, 26) by the HLR/HSS. This traffic management enables the total traffic volume to be reduced and is typically fully managed by the network operator.
  iii) QoS: The network uses QoS to manage traffic during high load situations and to support marketing propositions. To enable QoS considerations to be enforced by the offload decision module, a connection is established between the offload module and the Policy and Charging Rules Function (PCRF) entity. This enables decision criteria to be dynamically fed to the offload module, for instance to maintain high priority users on the core network path and/or high priority application types, such as VoIP. It is to be appreciated that the connection to the PCRF is not essential, and alternatively, static or semi-static rules, pre-stored with the offload module, can be considered.
  iv) Mobility: Mobility, such as cell handover, is an issue that needs to be managed by the core network. Therefore, terminals that are in motion might not be offloaded. The mobility of a mobile terminal could be determined by querying the Node B. Some users could be provided with a contract that allows only fixed or limited mobility use, so that the service provided was equivalent to a fixed broadband package. Different charging tariffs could be applied depending on whether a user was at a fixed location or mobile. Two ways the offload decision module can handle a mobile terminal's mobility are as follows:
  1. The offload decision module can have the capability to characterise the radio link between the device and the network by monitoring the number of handovers implemented for the mobile terminal. If a certain number of handovers occur over a fixed duration, the mobile terminal can be classified as in motion, and any data from the mobile terminal can thereafter be routed back into the core network to avoid any further packet data delay. This of course assumes that the mobile terminal had been designated for data offload on the bypass link.
  2. The offload decision module is situated on the IuPS for the 3G network (i.e. between the RNC and the SGSN) or S1 for the LTE (i.e. between the eNode B and the PoC), and checks the Iur or X2 signalling information (i.e. between a set of RNCs controlled by a given 3G SGSN and between a corresponding set of eNode Bs for LTE). If this monitoring shows that a mobile terminal is hopping between cells one of which is not connected to (and therefore managed by) the offload decision module, any data from the mobile terminal can thereafter be routed back to the legacy path through the core network.

Regulatory Services are services that are mandated by legislation, and are typically provided to all traffic. Some specific examples of Regulatory Services that can be taken into consideration by the offload decision module include:

i) Lawful Interception (LI): The ability to provide Lawful interception will be maintained in any offload or local breakout plans. The options for offload are:

Maintain the evaluation of LI in the core network, and not offload users whose traffic needs to be intercepted (e.g. where the user has been tagged by the police for communication interception). Since the LI functionality is handled by the core network, the core network accordingly cannot be bypassed;

Add LI capability to the offload decision module, which will require a local LI interface with a dedicated database identifying the users to be intercepted. With this option, upon identifying traffic from a user on the list, a copy of the data can be made at the local LI interface and the traffic offloaded. The copied data can then be reported to the appropriate authorities; or Alternatively, LI may be performed at the Internet Service Provider (ISP). With this option, since LI is considered at the ISP it is not a consideration at the offload decision engine, and so the data may be offloaded, where possible. However, to effect this option, a Service Level Agreement (SLA) with relevant ISP providers may need to be amended in order to include the support of LI in the ISP network rather than in the mobile network infrastructure.

ii) Regulatory Content Filtering (e.g. for Internet Watch Foundation (IWF)): This required functionality blocks illegal websites. This functionality could easily be added to the offload decision module as it is not processor intensive. An http proxy server, for instance, could be used to support this functionality. Otherwise, the traffic will be returned back to a dedicated core node(s).

A further criterion that the platform (24, 25, 26) module may consider is the priority of the customer. In this regard, a network operator may wish to prioritise traffic across its network based on the priority level of the customer. For example, a high value customer (e.g. a corporate customer or a subscriber with on a high tariff contract) may be given priority over a low value customer. In this situation, a network may decide to offload lower value customers directly to the internet. This is related to the QoS criterion mentioned above, although the QoS criterion is generally linked to traffic management to maintain a balanced network, whereas the priority referred to can be used to ensure subscribers get a level of service commensurate with their service agreement.

The embodiment of FIG. 2 is in relation to a 3G network. Embodiments of the invention are equally applicable to 4G (LTE/SAE) networks.

The LTE/SAE macro network includes eNode Bs which make up the RAN. The eNode Bs effectively combine the functionality of the node B and the RNC of the 3G network. These eNodeBs are the network components which communicate with the mobile communication devices. It is envisaged that the eNodeBs will be arranged in groups and each group controlled by a Mobility Management Entity (MME) and a User Plane Entity (UPE).

The MME performs many of the mobility functions traditionally provided by the SGSN. The MME terminates the control plane with the mobile device. It is responsible for terminating NAS (Non Access Stratum) Signalling such as MM (Mobility Management) and SM (Session Management) information as well as coordinating Idle Mode procedures. Other responsibilities of the MME include gateway selection inter MME Mobility and authentication of the mobile device.

The UPE manages protocols on the user plane such as, storing mobile terminal contexts, terminating the Idle Mode on the user plane, and PDP context encryption.

The platforms would operate in the same manner as described in relation to the 3G network. The platforms may be located at many different locations in the 4G network.

A more specific example of how the platform 24, 25, 26 may be implemented is described in relation to FIG. 4. FIG. 4 is a flow diagram illustrating a preferred method for deciding whether to offload data traffic to the internet. The decision structure is composed in a hierarchical form in order that certain types of user or data are always directed through the core network. The example of FIG. 4 is described for a 3G network but it will be clear to those skilled in the art that these decisions could be applied to any type of radio access technology.

Once a PS HSPA data call (or other connection) is made and received at the Node B at 600, a primary consideration by the platform 24, 25, 26 at 610 is whether the device is operating on its home network or whether it is roaming. If the device is roaming then all traffic is automatically routed through the core network. The reason for this is that the home network would want to guarantee the security and accurate billing (due to different charging principle between home and visited operator) of the user's traffic. The platform 24, 25, 26 at 610 will also consider other factors, such as what application types running on the mobile terminal require connections. If the mobile device is operating on its home network at 610, or if the applications do not require a connection to the core network, the platform 24, 25, 26 considers secondary offloading criteria at 620. Examples of secondary criteria may include the functions required by the device, the radio bearer currently used by the device, the APN, or the priority level of the customer identified, for example, through IMSI, IMEI or the target subscriber. If the offloading criteria are met at 620, the decision moves to the tertiary criteria, otherwise, the traffic is not offloaded.

At 630, the system checks the mobility of the user. If the user is moving, he is considered not suitable for offload due to an expected interruption delay of the user data when moving between source and target cell.

Finally, at 640 the system conducts a contents and policy check to confirm whether the user is suitable for offload. If it is determined that the user is suitable for offload to the internet, the eNodeB offloads the traffic to the internet at 650. If it is determined that the user is not suitable for offloading to the internet at 640 then the procedure returns "home" at 660. A connection is provided by a network core in a conventional way and the tests of the flowchart shown in FIG. 4 are repeated periodically to determine whether offloading directly to the internet becomes possible subsequently.

If the device is determined to be roaming at step 610, then the device is not offloaded directly to the internet, but remains connected via the network core in a conventional way at 670. Similarly, if the offloading criteria are not met at steps 620, the mobile device remains communicating via the network core in the conventional way, again at 670.

The hierarchical decision method is useful because it reduces the number of challenges across the network. It will be evident to those skilled in the art that different hierarchical structures will be appropriate for different networks, different conditions etc and that the example of FIG. 4 is just one way the decision could be made.

For instance, whilst arrangements have chiefly been described in relation to transmitting data traffic from a mobile terminal to a data network, the principles may also be applied to transmissions from a data network towards a mobile terminal.

In the arrangements described above the decision regarding the route is said to be made at call set-up. However, it should be appreciated that a decision to change the routing of data may be made at the beginning of a communication session (for example establishment of a PDP context), or during a communication session. The routing of data may change several times during a single communication session. For example, when a communication session is initiated it may be detected that the user is not moving, in which case a decision will be made to offload the data over the alternative data route. Subsequently it may be detected that the user is moving, and at this point a decision may be made to beginning routing data for the communication session via the mobile network. During the communication session, the mobile terminal may become stationary for a prolonged period of time again, and at this time a further decision may be made to send subsequent data during the communication session via the alternative data route. Subsequently again, the user may then attempt to access age-restricted content, and it will be detected that parental control is required. In response for the requirement for parental control, a decision may be made to redirect subsequent data during the Communication session via the core network so that core network parental controls can be applied.

It is to be appreciated that the present embodiments of the invention are to be distinguished from HSDPA offload, a technique used on the Iub interface between the Node B and the RNC. HSDPA offload which serves to separate data traffic from voice traffic, so that non-real time data traffic is sent down a less expensive backhaul to complement or replace the expensive E1/T1 TDM backhaul link between the two. Once this diverted traffic reaches the RNC, however, it is returned to the cellular and transport core networks and there is no differentiation made based upon data traffic type.

In the arrangement described above the platform 24, 25, 26 primarily handles data offload decisions. As will be described below, the platform can perform may other functions.

Arrangements in which the Radio Access Network controls the use of resources by mobile terminals will now be described.

Platform Architecture

As discussed above, a mobile telecommunication network is modified by the introduction of a "platform" 24, 25, 26. Such a platform (or control unit/means, also referred to as "SAVi") is shown in more detail at 700 FIG. 5 and which includes three principal parts: soft nodes 702 (physical/transport layer), network functions 704 and services 706 (application layer).

The platform 700 communicates with the radio frequency/RF part (radio unit) of a base station, such as a NodeB 1. The soft nodes 702 of the platform 700 comprise components such as a soft NodeB 708, soft BTS 710, soft eNodeB 711 and soft RNC 712 and soft SGSN/GGSN 714. The soft nodeB 708 provides functions equivalent to the baseband part of a conventional NodeB in a 3G telecommunications network. The soft BTS 710 provides baseband functions equivalent to the baseband functions of a BTS in a conventional 2G mobile telecommunications network. The soft enodeB 711 provides baseband functions equivalent to the baseband functions provided by a conventional enodeB in a 4G mobile telecommunications network. The platform 700 may therefore communicate with the radio frequency part of a 2G, 3G or 4G base station and provide appropriate baseband services for 2G, 3G or 4G technologies (or indeed for other technologies). A 3G mobile terminal that wishes to obtain telecommunication services from the mobile telecommunications networks connects wirelessly to the radio frequency part of a NodeB. Baseband functions may be provided either by a baseband part of the conventional NodeB or by the soft NodeB 708 forming an element of the soft node part of the platform 700. For example, the soft NodeB 708 may receive radio measurements from the radio frequency part of the NodeB to which it is connected, and may provide these radio measurements to other elements of the platform 700.

The network functions part 704 of the platform 700 includes modules for performing functions similar to those performed by the core network of a mobile telecommunications network, such as billing 720, location tracking 722 and the radio resource management (RRM) 724. The network functions may further comprise an offload decision module 726 that performs a function similar to the offload decision modules 24, 25 and 26 described above. The network functions part 704 may further comprise a caching function 728 and Content Delivery Network function 730.

The network functions part 704 of the platform 700 provides an Application Programming Interface (API) framework to the services part 706 of the platform 700. The services part 706 of the platform supports a plurality of applications 740, 742 etc.

The network functions fall into three main categories, those that enable the network operation (e.g. charging, O&M), those that support service operation (e.g. Location) and those that optimise the usage of the network by certain applications and services (e.g. Caching, Video Optimisation).

The applications supported on the Platform 700 are the entities that supply or demand the flow of data on the network, akin to a server on the internet, e.g. gaming server, navigation server.

The API is implemented by a software program running on the network function part 704 which presents a novel standardised interface for the applications 740, 742 etc of the services part 706. The novel standardised API provides a consistent interface, defining communication protocols, ports etc. Full details of the API may be published to allow a multiplicity of applications to be developed for the platform 700 by multiple developers. This should be contrasted with prior art arrangements where each component of a mobile telecommunications network (such as BTS, BSC/RNC, SGSN etc) is proprietary and tends to have a unique interface, meaning that a different application must be written for each node of a conventional network.

The applications 740, 742 etc may provide services to users of the telecommunications network by co-operating with other parts of the platform 700.

The details of the use of each application used by a user of the mobile telecommunications network are stored in an application context/container. The Application context contains application names, protocol used to carry such application, their characteristics that are measured/reported over period of time and some statistical information about these applications (volume, number of users using these applications, etc.).

As shown in FIG. 6, a platform 700 may be provided at each base station of the mobile network (where it is connected to the radio frequency part of the base station—NodeB 1 in FIG. 2), forming an access node 800. Platform 700 may also be provided at the RNC (item 3 in FIG. 2) where it forms a gateway 802. The access node 800 and the gateway 802 are both configured to communicate directly with the network core 804 (for example, comprising the SGSN 5, GGSN 6 and VAS 7 (as shown in FIG. 4)). The access node 800 and gateway 802 may also be connected to the internet 8 for direct internet access via direct links 806 and 808, respectively, such that at least a portion of the core network 804 is bypassed in the manner described above.

The following are examples of access technologies that can be provided within the access node 700:
3GPP: GSM/GPRS, UMTS/HSPA & LTE
IEEE: 802.11 family & 802.16 family
ITU: DSL, ADSL, VDSL, VDSL2
Allocation of Functions to Platforms The steps performed when a mobile terminal is activated at a NodeB, at the Femto or at the Access Point (AP) of the network which includes the novel platform 700 will now be described with reference to FIG. 7. At step 9A the mobile terminal (UE) is activated within the coverage area of a particular NodeB, at the Femto or at the AP. The access part of the NodeB, at the Femto or at the AP communicates information from the mobile terminal to the platform 700 associated with the NodeB, at the Femto or at the AP. At step 9B the platform 700 then allocates the baseband NodeB, at the Femto or at the AP function and the RNC or BRAS (Broadband Remote Access Server) function either at access node 800 at the NodeB at the Femto or at the AP site or at the gateway 802 at the RNC or BRAS site of the network or even from neighbouring nodes that have spare resources to pull. The decision as to whether the RNC or BRAS function is allocated at the platform 700 of access node 800 or the gateway node 802 may be made depending on various criteria, including:

The device type—for example this decision can be based on the radio access capabilities that the mobile terminal indicates upon activation, such as whether it is operating in the circuit switched or packet switched domains.

The location of the mobile terminal. If the mobile terminal is near the edge of the cell (which can be determined by network power measurements or neighbour cell measurements from the mobile terminal, within a plus or minus 3 dB range for the RACH).

The establishment cause of the connection request: such that the NodeB can filter the unnecessary signalling information from the mobile terminal which is not critical—for example periodic routing area update messages.

Upon allocating the baseband NodeB at the Femto or at the AP and the RNC or BRAS function, the NodeB at the Femto or at the AP may allocate the mobile terminal to a particular carrier dedicated to the RNC or BRAS function.

Once the RNC or BRAS function is allocated to either the access node 800 or the gateway 802 at step 9C, other functions performed by the platform 700 at the access node 800 (or other access node) and the gateway 802 (or other gateway) are allocated to the mobile device. All other platform functions may be provided by the platform where the RNC or BRAS function is allocated to the mobile terminal. However, a platform at a different location to that which provides the RNC or BRAS function to the mobile terminal may provide some or all other functions.

At step 9D the platform which is allocated the RNC or BRAS function is provided with a Common ID message from the core network 804.

At step 9E, this message is used by the platform 700 to look up the complete subscription information for the mobile terminal, as well as the resource requirements (QoS) of the services required and negotiated PDP context, this information being provided by the core network 804.

The subscription information relating to the device that is obtained from the central nodes (e.g, core network) 804 is used to allocate the other functions at access node 800 and/or the gateway 802 in dependence upon various factors, including:

Detailed information regarding the mobile terminal type obtained from the core network.

The subscription characteristics of the mobile terminal.

The applications previously used most frequently by the mobile terminal.

The characteristics of the applications previously used by the mobile device and the performance requirements thereof.

The historic mobility of the mobile terminal (speed, connection, distance travelled etc).

The location of the mobile terminal and the likely destination of traffic from the mobile terminal based on historic usage patterns.

The load of the NodeB providing RF services to the mobile terminal, and the historic traffic trends at that NodeB at Femto or at AP.

The characteristics of the NodeB at the Femto or at the AP providing RF services (for example, the location, what other devices are connected through the NodeB at the Femto or at the AP, the number of machine to machine devices being attached and served by the NodeB, etc).

As mentioned above, a single mobile terminal may have platform functions/applications allocated on a plurality of platforms. Generally, when a mobile terminal is near-stationary it is most efficient for its functions/applications to be served from an access node 800 (i.e. distributed), whereas mobile terminals with greater mobility (or lower anticipated cell hold times) will be most efficiently served by having fewer or no functions/applications served from the access Node 800, and more or all functions/applications served from a gateway 802 (i.e. centralised). The assignment of functions/applications to a mobile terminal between an access node 800 and a gateway 802 will also depend upon the characteristics of the service type provided by the application (for example, the average IP session duration, the popularity of the particular application, the average mobility of mobile terminal using the service provided by the application etc).

Traffic management may be performed at the access node 800, where there is access to real-time radio information from the radio frequency part of the NodeB, the Femto or the AP serving the mobile device.

Centralised Radio Resource Management (RRM) may be provided at the gateway 802, and maintains performance across different access modes 800, which may have different radio access technologies, frequency bands, coverage etc. The RRM function 724 of the platform 700 of the gateway 802 may obtain information regarding radio traffic management from each access node 800 to dynamically position subscribers to particular radio technology. This technique will be used to allocate network resources based on the resource availability, application used and user mobility, For example, the traffic management information may be provided by the soft NodeB 708, Femto or AP of the platform 700 at the access node 800. This soft NodeB 708 obtains radio information relating to the mobile terminal from the radio frequency part of the NodeB to which the mobile terminal is wirelessly connected.

For a particular mobile terminal, functions provided by an access node 800 and gateway 802 may be coordinated to work together in an advantageous manner (i.e. a hybrid or distributed arrangement). For example, the gateway 802 may set operating limits or ranges within which functions performed by the access node 800 may be performed, without reference to the gateway 802. When the functions move outside the ranges set, control of those functions may be passed to the gateway 802.

Further, the access node 800 and the gateway 802 may cooperate to advantageously optimise content delivery to a mobile terminal.

The optimisation of content delivery will now be described with reference to FIG. 8 of the drawings. Content may be optimised at gateway 802 and at an access node 800. The gateway 802 may serve multiple access nodes 800, and my distribute content to those multiple access nodes 800, for onward transmissions from each of those access nodes 800 to a mobile terminal via the radio frequency part of NodeB, the Femto or the AP serving that node. Radio quality measurements are reported by the mobile terminal to the access node 800 at regular intervals, such as 2 millisecond intervals. Radio quality measurement relating to that mobile terminal are transmitted between the radio frequency part of the NodeB, the Femto or the AP serving the mobile terminal to the access node 800 at regular intervals, such as between 2 and 10 millisecond intervals. These radio measurements are received at the soft nodes 702 and are passed to functions 704 (e.g. to QoS function 732 for analysis). These radio frequency measurements from the mobile terminal and the NodeB are reported by the access node 800 to the gateway 802 (e.g. to QoS function 732 of the gateway 802 for analysis) at regular intervals, such as intervals of between 1 and 10 seconds. The gateway 802 may receive radio information from multiple access nodes 800. The radio measurements received by the gateway 802 may be analysed over a relatively long period, such as between 1 and 2 minutes. The radio quality measurements may be averaged (for example, the arithmetical mean of the radio quality maybe determined) over this time period. The transmission of content from the gateway 802 may then be optimised according to this calculation. Where the content is distributed by the gateway 802 to a plurality of access nodes 800, the content distribution will be based on the analysis of the radio quality indicators from all of the access nodes 800. The analysis may consider the maximum or peak radio performance over the time period of between 1 and 2 minutes.

When the content is received by each access node 800, the access node 800 then distributes the content to each mobile terminal. This distribution is optimised based on real-time network mode and mobile terminal specific radio link quality, as determined over a period of, for example, between 1 and 10 milliseconds. That is, content delivered to a mobile terminal that has high radio link quality may be optimised in a different manner to a mobile terminal that had poor radio link quality.

The co-operation between access nodes 800 and gateways 802 may further enhance the distribution of content in a manner now to be described with reference to FIG. 9.

When a mobile terminal requests a particular content item, this request is transmitted to the access node 800 serving that mobile terminal, assuming that this is the first request for this content item to the access node 800, the access node 800 passes this request to the gateway 802 serving the access node 800. Assuming that this is the first request for this content item from the gateway 802, the gateway 802 retrieves the content from a content server. The content is then provided by the content server to the gateway 802, and from there is distributed to the access node 800, and onwardly to the requesting mobile terminal. Advantageously, the gateway 802 maintains a record of content items that are requested frequently. When a content item is determined by the gateway 802 to be requested frequently, this is stored in a cache 1110 associated with the gateway 802 (which may be the cache 728 of the platform 700). Subsequent requests for that content item from access nodes 800 to the gateway 802 can then be serviced by retrieving the content item from the cache 1110 and distributing the content item to the requesting access node 800, and thus avoiding the need to request the content from the content server.

The gateway 802 may be further configured to identify popular content items that are likely to be requested by a large number of access nodes 800. When it is determined that a content item is popular, the gateway 802 may push these content items to each of the access nodes 800 associated therewith (so that this content is hosted at the access node 800, using Content Delivery Network (CDN) function 730 of the network functions 704 of the gateway 802 and the access node 800). The content is then available at the access node 800 for transmission to any mobile terminal that requests it, without having to retrieve this content from the gateway 802 or the content server. Advantageously, the distribution of such content items is performed in a manner which takes into account the capacity or the congestion of the link between the mobile terminal and the gateway 802 and the nature of the content. For example, typically a link between a mobile terminal and the gateway 802 may experience very little usage and congestion in the early hours of the morning. The content item can be advantageously transmitted in between the gateway 802 and the access node 800 at this time, when there is spare capacity. The gateway 802 will determine whether the content item is suitable for transmission on this basis, for example, by taking into account a number of times that the content item has been requested, the size of the content item and the storage space at the access node 800. If a content item is relatively small and is time-critical, such as news headlines, then such a content item may be distributed frequently throughout the day, as such content is not suitable for transmission once a day at early hours of the morning, as it becomes quickly out of date.

Relocation of Mobile Terminal

The procedures performed when a mobile terminal moves between cells in the mobile telecommunications network will now be described with reference to FIG. 10. In the conventional manner at step 12A, when the mobile terminal moves to the edge of its current serving cell, the radio measurements reported from the mobile terminal and the radio frequency part of the NodeB, the Femto or the AP serving that mobile terminal are used by the core network to determine when to perform a handover and to which target cell the handover should be performed. When the best target cell has been identified, handover to that target cell from the serving cell it is performed at 12B in a conventional manner.

At step 12C selected platform functions may be relocated from the source access node (that served the old cell) to the destination access node (that serves the new target cell).

When the source and destination access nodes are served by the same gateway, only base station function (such as soft NodeB functions 708) may be relocated to the destination access node.

The relocation of functions of the access nodes is performed independently to the radio handover, so for some time after the radio handover, the source access node continues to serve content to the mobile terminal through the destination access node. The routing of data packets for the 3G network between the destination and the source access nodes may be performed using an Iu interface between the RNC or BRAS function 712 of the destination access node and the SGSN/GGSN function 714 of the source access node. Alternatively, the routing of data packets between the destination and the source access nodes can be completed by the SGSN/GGSN function 714 of the destination access node connecting directly to functions of the source access node through an IP interface.

After handover has been completed at step 12B, the access node controlling the mobile terminal may be relocated from the source access node to the destination access node in coordination with the gateway. the standardised handover decisions (mainly based on coverage, quality, power, interference, etc.) for 2G, 3G, LTE & fixed network are used to move the mobile from one node or system to another. However, the platform 700 introduces new opportunity to make the handover decision based on type or characteristics of the certain application, type of user and the QoS requirements.

The timing of the relocation of access node functions from the source to destination platform may be dependent on the following:
- the duration of the current connection/communication of the mobile terminal
- the speed of movement of the mobile terminal
- the characteristics of the applications being used by the mobile device, the quality of service, the predicated type and amounts of transmission ongoing.
- The radio resource allocations status at the mobile terminal
- The respective node of the source and destination and access nodes.

At step 12D, optionally, some functions will be reallocated from the access nodes to the gateway. For example, if the destination access node is heavily loaded and is congested, or has a lower capability then the source access node, or the mobile terminal is determined to be very mobile, it may be advantageous to transfer functions to the gateway. Functions are reallocated from the access node to the gateway by, for example, a Serving Radio Network Subsystem (SRNS) relocation between the RNC function 712 of the access node and the gateway. Alternatively the functions may be reallocated by performing a radio reconfiguration of user connection to the mobile terminal.

The reallocation of functions from an access node to the gateway may be performed at call/communication sessions set-up. At call/communication session set-up, further subscriber information will be provided, which may be used by the access node or gateway to determine whether it would be advantageous to reallocate functions from the access node to the gateway. Reallocation of functions from the access node 800 to the gateway 802 may be performed during an active connection when a requirement of the communication sessions has been modified, or where the required resource is not available at the access node 800.

According to the same principles, applications may be (re)located (or distributed) between access nodes 800 and for gateways 802 to provide optimised application delivery/best use of the communication resources.

As mentioned above, information about each application used by the user at the mobile terminal is stored in an application context. The application context is shared between each access node 800 and gateway 802 that control the user connection for that mobile terminal. One of the access nodes 800/gateways 802 will be the "master" for that particular application, and that will also be the master of an application specific record in the application context. The application context is advantageously periodically synchronised between the access node 800 and the gateway 802.

The application information is the application context specific to a particular mobile terminal, and this is passed between access nodes and gateways during reallocation for a mobile terminal, enabling the application to be seamlessly passed access nodes/gateways, avoiding impacts to the user experience.

FIG. 11 shows the transfer of application information between access nodes and gateways.

Tailoring Bandwidth to Application

Radio measurements received from the radio frequency part of the NodeB, the Femto or the AP serving the mobile terminal are passed to the soft nodes 702 of the platform 700 (of the access node 800 or gateway 802 serving the mobile terminal), and are passed to the network functions 704 of the platform 700, which then distributes the measurements to where necessary within the platform 700. The platform 700 has access to the subscriber information from the core network, which allows the network functions 704 to deliver data traffic in a manner that is optimised for radio conditions as indicated by the radio measurements. The data traffic may also be optimised according to the subscription of the user of the mobile terminal available radio resource, mobile terminal capability, and/or for the class of the terminal (e.g. access technologies used). This optimisation allows bandwidth usage to be balanced with customer experience. The subscriber information may include information about the price plan of the user of the mobile terminal. The mobile network operator may track the type of application used by the user, the total data usage of the user, and may differentially target radio resources the highest data value stream of users.

By hosting applications 740, 742 in the services part 706 of the platform the access node 800 (or at least the gateway 802), the point of the network that is aware of the application being used by the user of the mobile terminal closer in the link between the mobile terminal and the core network to the NodeB serving the mobile terminal. This enables the sharing of network resources to the most appropriate data streams, such as the most profitable data streams. Such awareness of the application to which a request for data transmission relates allows the use of low value data streams, such as peer-to-peer file sharing, to be allocated only limited bandwidth, so that remaining bandwidth can be targeted to particular users. In the uplink, transmission of data can be controlled by the access node 800 (or gateway 802) hosting the application to control data flow appropriately before data is onwardly transmitted towards the core of the network (which was not possible with conventional arrangements).

Application Programming Interface (API)

As mentioned above, a novel API is provided which defines the language that each of the software modules 740, 742 of the platform 700 use to communicate to coordinate to optimise application delivery to users. The platform 700 negotiates which each application 740, 742 the specific resource and performance requirements based on the application characteristics, allowing the application to directly communicate the scheduling performance requirements, rather than using a predefined set of quality of service parameters. This negotiation between the platform 700 and the applications 740, 742 is facilitated by the API.

The API may also facilitate the provision of radio link quality information (e.g. from QoS function 732) to applications 740, 742.

The API may further enable the platform 700 to control use of the applications 740, 742—e.g. to allow, disallow or adapt the applications.

By way of example, the application 740 may be a Voice over IP (VoIP) application. The nature of Voice over IP communications is that there is a virtually continuous succession of small data packets in which voice data is communicated. The voice data must be communicated with no or minimal latency in order that a two-way conversation can be performed successfully. The Voice over IP application 740 is able to compress voice data before transmission using a variety of techniques/CODECs. The compression techniques/CODECs may range from a relatively low compression technique, which provides high quality voice reproduction but requires a large bandwidth, to a much higher compression technique which provides reduced voice quality and which requires a much lower bandwidth.

The API is operable to provide details of the application characteristics to the network functions part 704 of the platform 700. This makes the network functions part 704 of the platform aware of the characteristics of the application. In the present example, as the application is a Voice over IP application, the network functions part 704 may be made aware that the application will tend to transmit continuous successions of small data packets that require transmission with no or low latency. The network function 704 may then be configured appropriately.

The API may further be operable to allow the network functions part 704 to communicate radio link quality information to the application 740. For example, when the network functions part 704 received information regarding the application characteristics (via the API), it may allocate radio link resources to that application 740. This allocation of radio link resources may be communicated by the network functions part 704 to the application 740 (via the API). The application 740 may then select an appropriate compression technique/CODEC in dependence upon the radio link quality available. During a Voice over IP call, the available radio link quality may be communicated regularly from the network functions part 704 to the application 740 (via the API) to allow the application 740 to vary the compression technique/CODEC used in accordance with changes to the radio link quality.

The network functions part 704 may control how the applications 740, 742 work (via the API). The network functions part 704 may allow, disallow or adapt the applications 740, 742 hosted in the services part 706 of the platform 700. For example, the network functions part 704 may require the Voice over IP application 740 to use a particular compression technique/CODEC if radio link bandwidth is restricted.

Another example of how the network functions part 704 may advantageously provide radio link quality information to an application (via the API) is when the application 742 is a gaming application used by several users. If the radio link quality information received by the application 742 indicates that bandwidth is restricted, the application 742 may adapt is communications to the users such that latency of the communications is increased uniformly for all of the users (so that they all experience the same delay), in order that each of the users is provided with the same gaming experience.

In the arrangements described, the devices that connect to the platforms 700 are mobile devices that connect to the platforms via the radio access network of a mobile/cellular telecommunications network. It should be appreciated that non-mobile (fixed) devices may be connected to the platforms 700, for example by a wired or cable connection.

Allocation of Services

The control means is responsible for allocating the service instance for each UE, based on the UE locations and the control means capacity, capability and available resources to host another instance of a service. The UE is using service but the User (MSISDN) gives access to specific services.

For certain low popularity services or where the available serving control means capacity or capability is limited, the service can be hosted from a central control means, or from a neighbouring distributed control means.

For some services/functions, where the source and destination client applications are in the same geographical region, being served by the same site (e.g. BTS location) or site cluster (e.g. finite number of sites), the access node 800/gateway 802 ensures that the server for the service is located close to both users, and the traffic is routed between the users within the site.

The arrangement described above in relation to FIGS. 1 to 11 is the subject-matter of EP2315412. Such an arrangement deals with LI and other core network functions by always routing traffic that must be subject to LI and other core network functions through the core network, or by providing LI and other core network functions functionality at the network edge.

An alternative known representation of the platform 700 is shown in FIG. 12. The platform 700 includes a platform core 1000 which communicates based on two sets of APIs:

Application APIs 1010—which, as discussed above, offers standardised hosting environment for applications providing communication to Service Software 741, 742 and Network Functions Software 1015, 1016 hosted on the platform 700.

Network APIs 1017—which provide control and connectivity to network nodes 1030 through a vendor specific Adaptors 1020; Network API defines standardised communication between core 1000 and the Adaptors 1020; Communication between Adaptor 1020 network nodes and 3GPP/LTE node, such as (e)NodeB 1, BBU 1032, RNC 3, SGSN 5, GGSN 6/P-GW and MME 1040, remains proprietary The Platform 700 includes common network functions Software 1015, 1016 such as Scheduling, Routeing, Billing/accounting, security and Policy functions, which allow the architecture to offer seamless experience across the network.

The Adaptors 1020 translate the Vendor specific implementation on the 3GPP/LTE nodes 1030, such as eNB, BBU, RNC, SGSN, GGSN/P-GW and MME, to common and open interface to the environment of platform 700.

The Adaptor 1020 for each 3GPP/LTE node 1030, such as eNB, BBU, RNC, SGSN, GGSN/P-GW and MME, is responsible for ensuring communication between the Network API 1017 and 3GPP node is secure.

The Platform 700 provides the capability for some Applications 741, 742 hosted in the Platform 700 to be contacted remotely from the platform 700.

Logically control and data traffic interfaces (control plane and user plane) between the physical manifestations of the platforms 700 exist independent of the underlying 3GPP/LTE network nodes 1030. These interfaces will require to be made secure through functionality included within each platform 700.

The Platform 700 may also provide the capability for hosted Network 1015, 1016 and Service Applications 741, 742 on different platforms 700 to communicate and pass data in a secure manner without mandating security to be provided by the application 741, 742, 1015, 1016.

In contrast to the arrangements described above, in this implementation the platform 700 may handle both control and data traffic interfaces (control plane and user plane), rather than just the data traffic/user plane. Further, in contrast to the arrangements described above the nature of the gateway 802 may be different. In the implementation described hereinafter, the gateway 802 may be located other than at the RNC. For example, the gateway 802 may be located at the SGSN 5, GGSN 6, VAS 7 or PCRF apparatus 9, or in any part of the network core or RAN. In the implementation described hereinafter, the gateway 802 may be considered to be an interface between the platforms 700 at the access node (800) and the core network, rather than part of the "control means".

When the platform 700 environment is introduced into a mobile network it means that traffic can be inserted, hosted or created in the data path between GGSN 6 and UE, potentially impacting the operation of existing core systems (such as charging, policy enforcement & LI from other core network components (Charging rules and IT Network 9A, Policy Server 9 and including the Lawful Interception Database (LI DB) 30—see FIG. 2) which need to be replicated.

The embodiments of the present invention seek to provide an alternative arrangement for reusing core network services/functions, such as LI or charging in the legacy core infrastructure.

SUMMARY OF THE INVENTION

In one aspect the present invention provides a mobile telecommunications network including:
- a core network having content processing means operable to provide a core network service relating to content, and
- a radio access network having radio means for wireless communication with a terminal registered with the telecommunications network, wherein the radio access network includes a local source of content, wherein the telecommunications network is arranged to:
- deliver content from the local source of content to the terminal,
- to send to the core network an indication of the content delivered from the local source of content to the terminal,
- to obtain a copy of the content of the local source of content provided to the terminal, and
- to provide the content processing means core network service in relation to the copy of the content.

In the preferred embodiment, the copy of the content is not obtained making a copy of the content of the local source. Rather, the copy is obtained from another source, but is generally identical to the content of the local source—i.e. it is a copy or duplicate of the content of the local source (even though it is obtained independently from the local source).

The copy of the content may be obtained from a primary content source such as the Internet. The copy of the content may be obtained from a primary content source such as a central (Gi) cache.

In the embodiment, the core network is operable to discard the copy of the content after provision of the content processing means core network service thereon. The copy of the content does not need to be delivered to the terminal as the content from the local source (e.g. cache, CDN) has been delivered to the terminal from the local source of content.

In the embodiment, the telecommunications network is operable to provide content from the local source of content to the mobile terminal immediately (after verification that the cached content on SAVi NodeB is the same as the one in the Gi Cache or the Internet), in response to a request for that content. In the embodiment, the telecommunications network is operable to send the content from the local source of content to the terminal before the content processing means provides the core network service relating to the content. This is to be contrasted with an arrangement where it is required that core network services must be applied to the content (or a copy thereof) before the content can be delivered to the terminal. The user experience is therefore improved by the embodiment.

The telecommunications network may be operable to determine whether the user of the terminal requires content filtering. If no content filtering is required this makes the embodiment particularly suitable for use. If content filtering is required, an alternative content delivery scheme may be used. If content filtering is required, this may be performed in the radio access network. If content filtering is required, prohibited content may be flagged so that this is not delivered by the radio access network.

The telecommunications network may be arranged to deliver the content from the local source of content to the terminal as a content item comprising a plurality of packets, and to send to the core network the indication of the content item delivered from the local source of content to the terminal. For example the content item might comprise a move clip or a music track. This should be contrasted with arrangements where each packet of content data is identified to the core network separately.

In the embodiment, the indication enables the content item to be identified and retrieved from the primary content source.

The telecommunications network services may include, for example, Lawful Interception (LI) and/or charging. Other network services are also contemplated, as discussed in the detailed embodiments.

The telecommunications network may be a cellular network, such as a 2G, 3G or 4G network.

BRIEF DESCRIPTION OF THE DRAWINGS

An embodiment of the present invention will now be described in more detail with reference to the accompanying Figures in which.

In the figures, like elements are generally designated with reference numbers.

DETAILED DESCRIPTION

An improved arrangement for providing core network services such as LI will now be described. This arrangement uses many of the principles described in relation to FIGS. 1 to 12 above, and these form part of the embodiments to be described.

Figure 1:
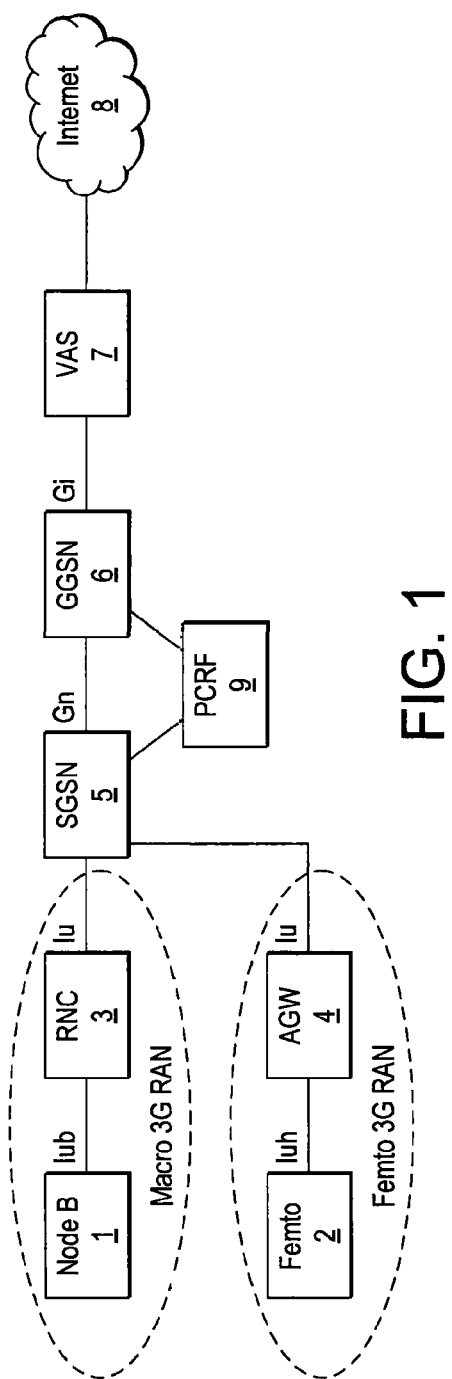
FIG. 1 illustrates known a high level packet data network architecture, useful for explaining the prior art and embodiments of the present invention.
Figure 2:
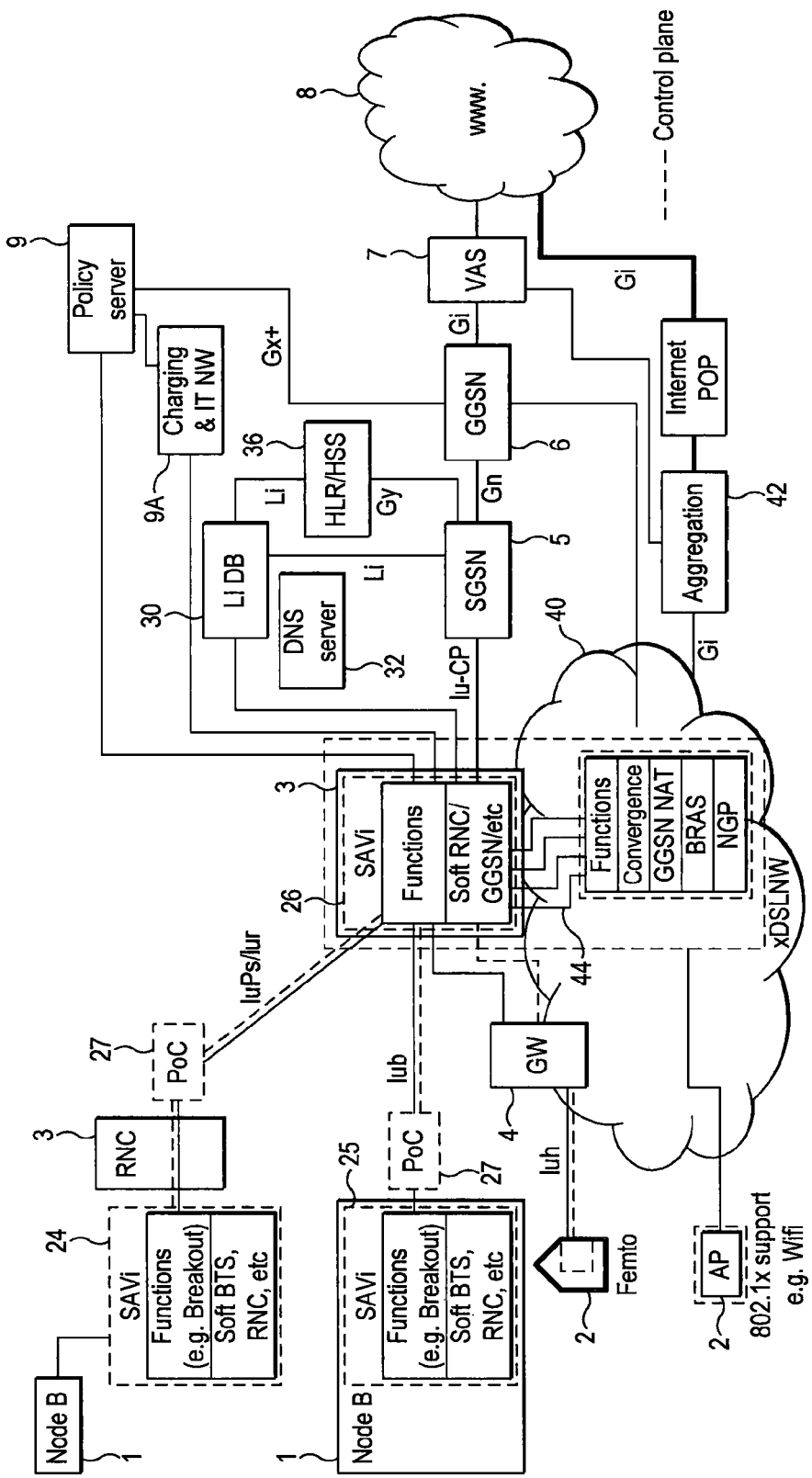
FIG. 2 illustrates the introduction of a functional "platform" in a 3G network.
Figure 3:
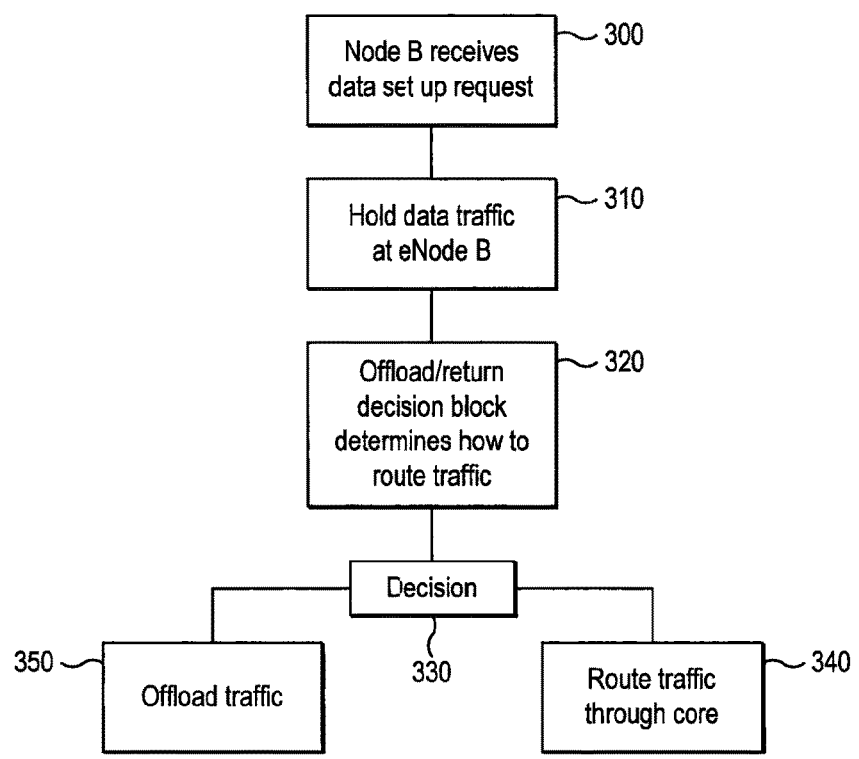
FIG. 3 illustrates a flow chart of an example offload decision process as implemented in the 3G network of FIG. 2
Figure 4:
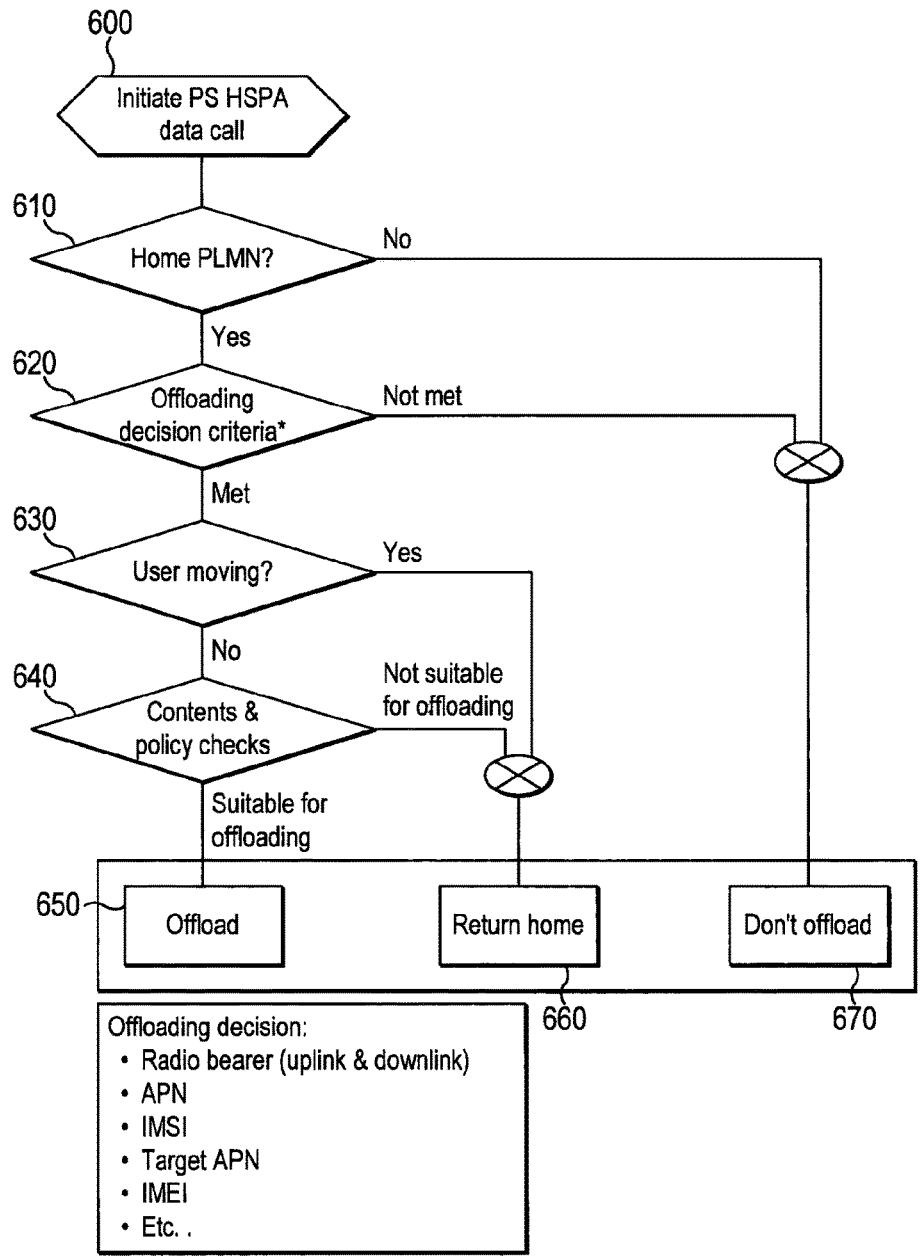
FIG. 4 illustrates a flow chart of an example offload decision making process that may be implemented by a redirection module
Figure 5:
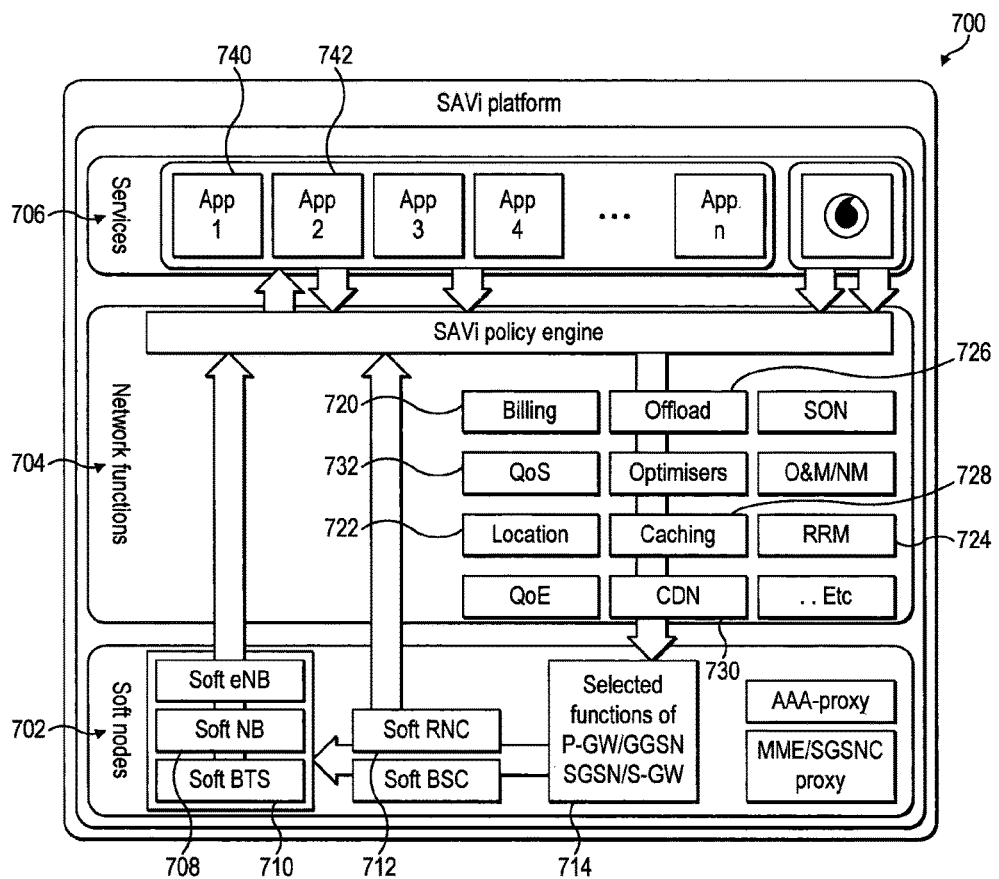
FIG. 5 shows the novel "platform" in more detail provided in the Radio Access Network in accordance with an embodiment of the invention.
Figure 6:
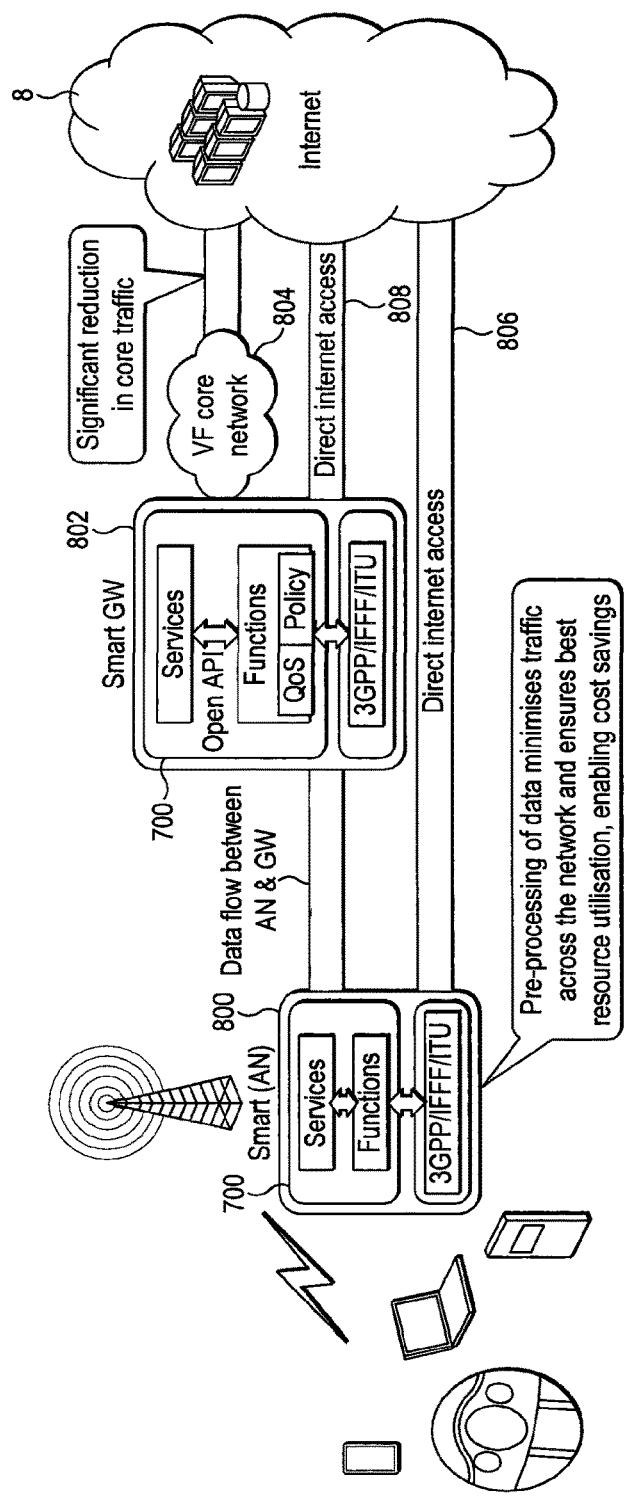
FIG. 6 shows possible locations of the platform within a mobile telecommunications network.
Figure 7:
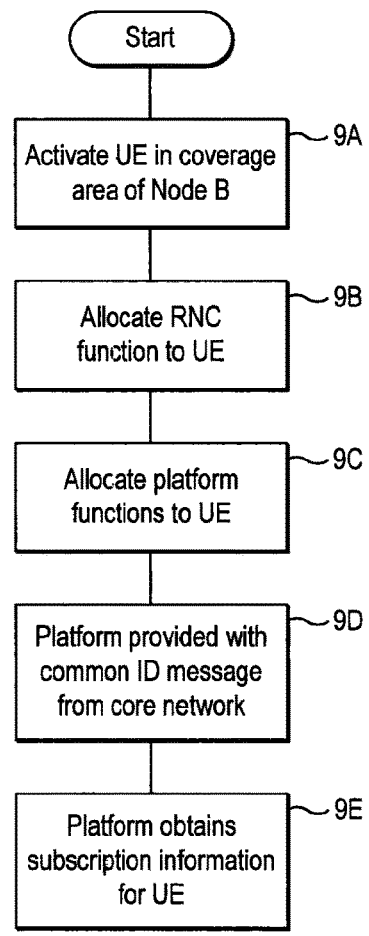
FIG. 7 is a flow chart showing the steps performed when a mobile terminal is activated.
Figure 8:
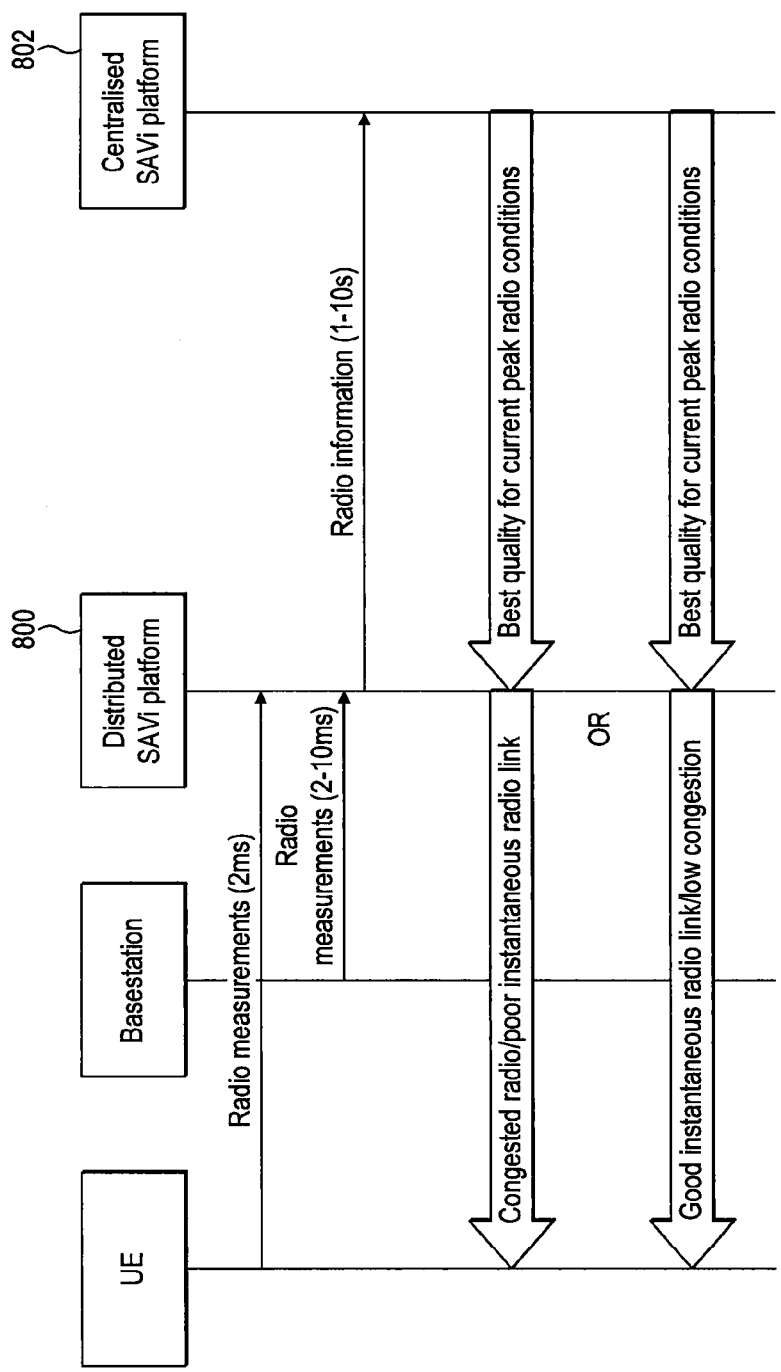
FIG. 8 shows the optimisation of content delivery to a mobile terminal.
Figure 9:
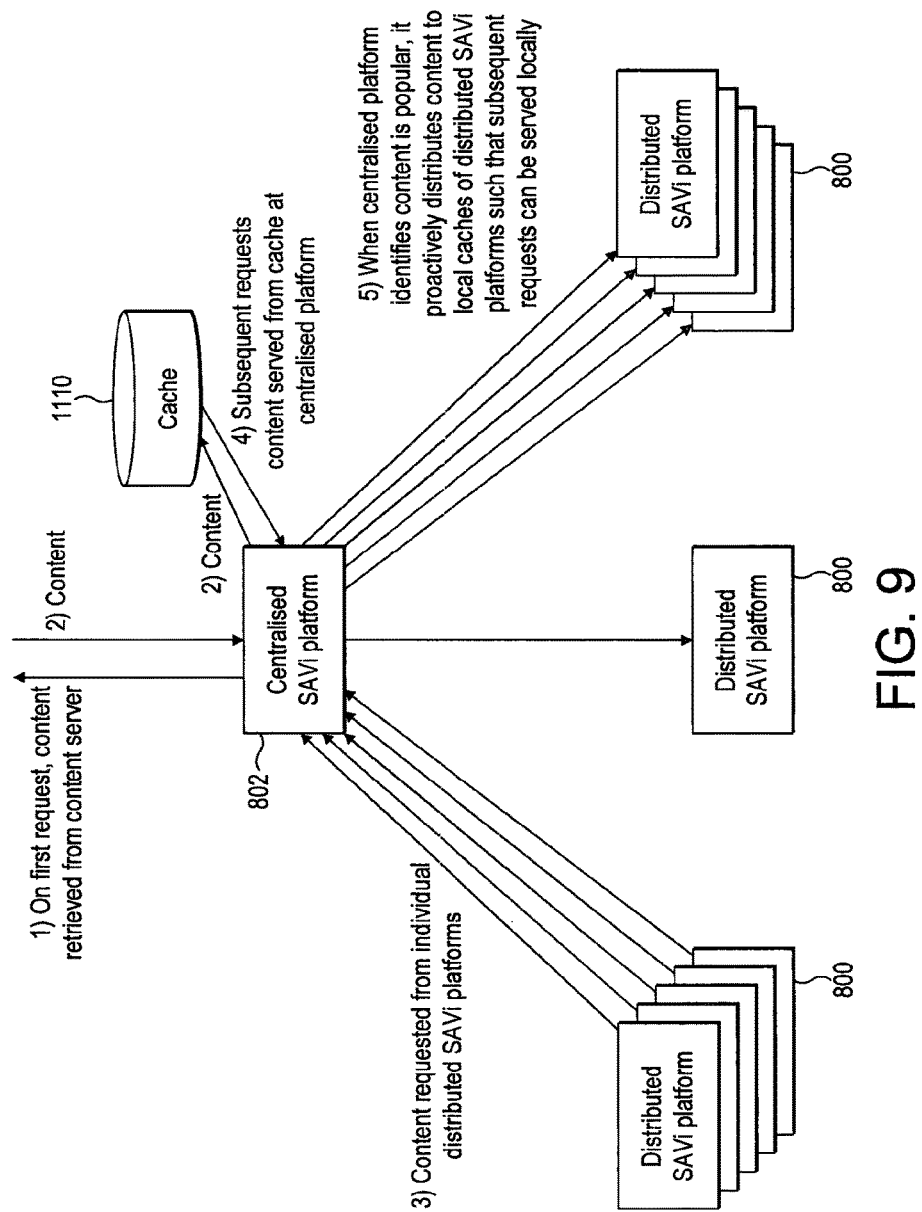
FIG. 9 shows a further optimisation of content delivery to a mobile terminal.
Figure 10:
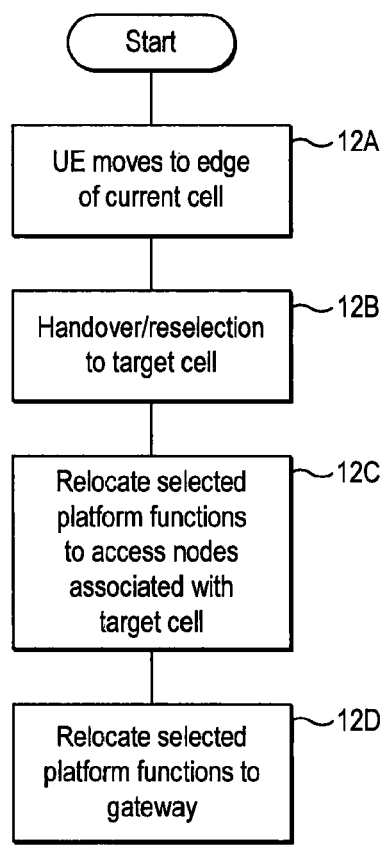
FIG. 10 is a flow chart showing the procedures performed when a mobile terminal moves within the network.
Figure 11:
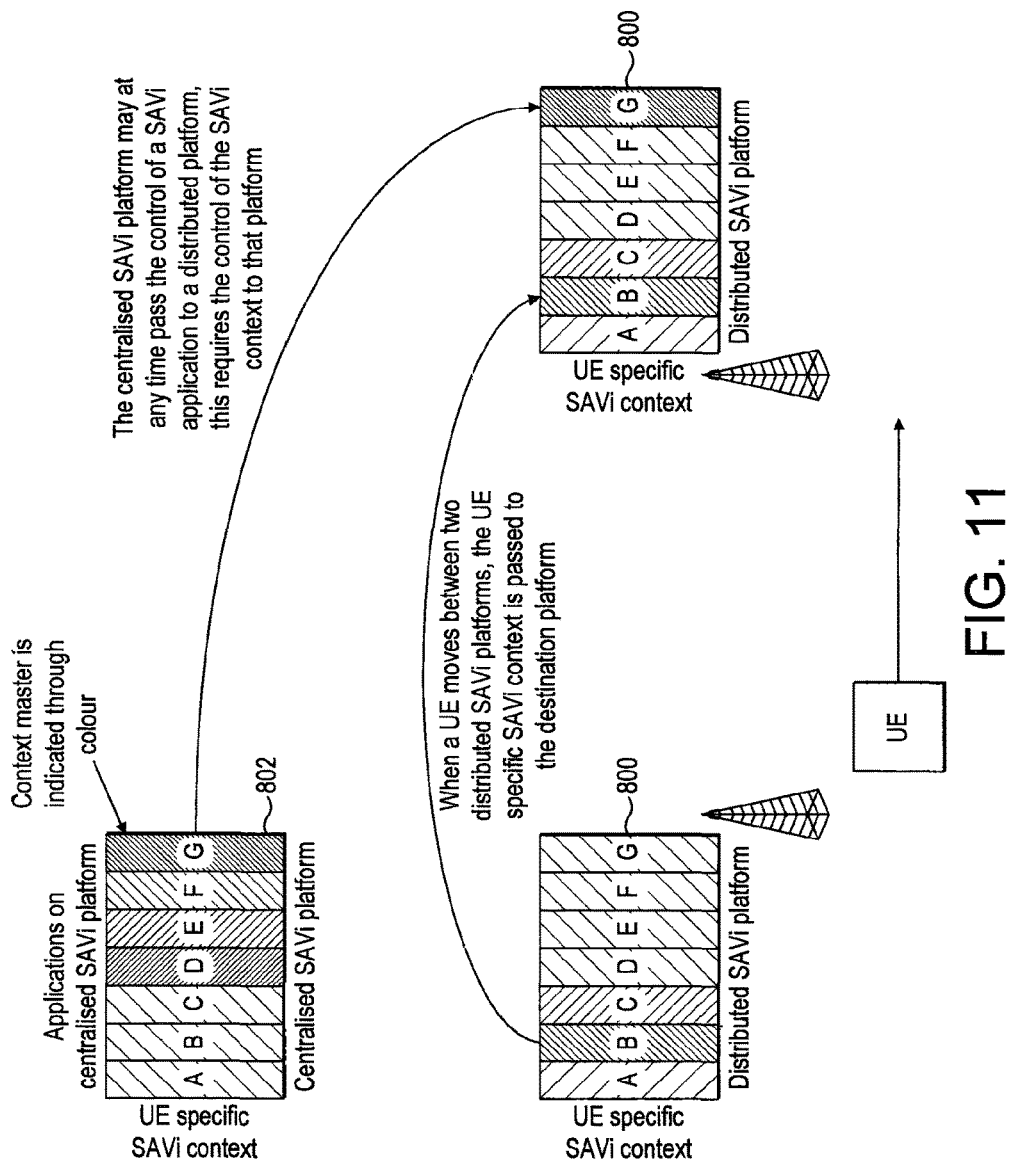
FIG. 11 shows the transfer of information between platforms.
Figure 12:
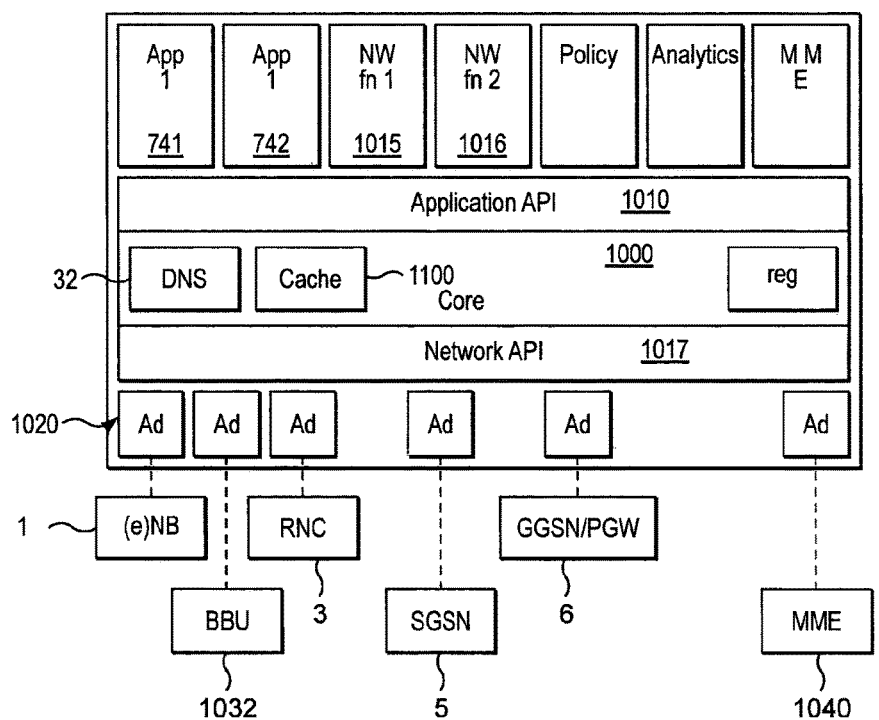
FIG. 12 shows a modified version of the "platform"
Figure 13:
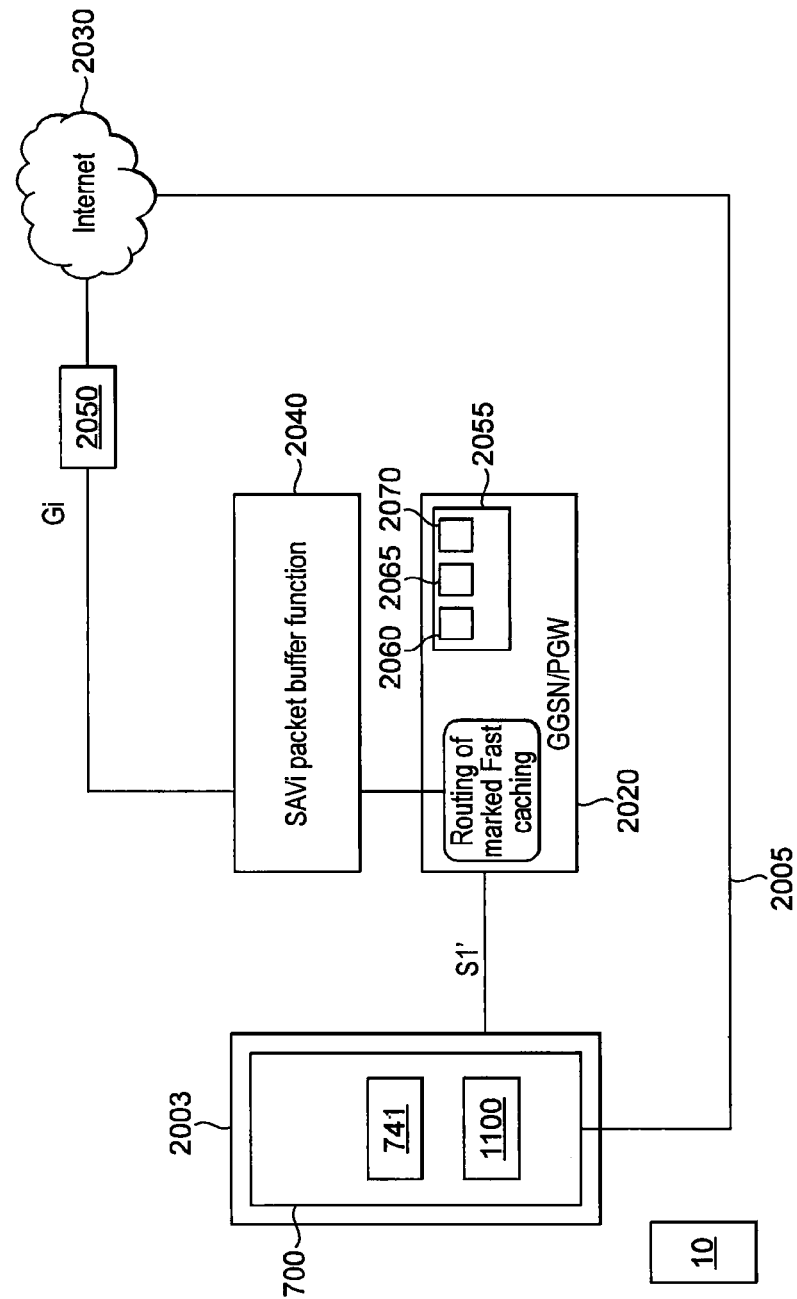
FIG. 13 shows a system architecture for illustrating the operation of an embodiment of the invention.

FIG. 13 shows the system architecture of certain elements of the network. The platform 700 is provided at the network edge and provides (e)NodeB functions to the mobile terminal (user entity, UE) 10 by wireless communication. The platform 700 includes a cache 1100. The cache 1100 stores content for delivery of this content to the UE 10 when required. The content may be delivered to the cache 1100 by any suitable mechanism, such as those described above. For example, the content may be delivered via the core network or may be delivered via a direct connection 2005 to the internet, which bypasses the core network. The cache 1100 may correspond to the cache 728 of FIG. 5.

The platform 700 further includes an application 741 which may generate content for supply to the UE 10. In practice, a plurality of applications are likely to be hosted on the platform 700.

It should be understood that, even when content is available at the network edge, a significant amount of content that the UE 10 wishes to consume is likely to be located elsewhere, and this content will be obtained in the conventional manner via the core network.

As discussed above, when content is provided to a UE 10 from the network edge, core network services will be bypassed. This is often unsatisfactory as some core network services, such as content filtering and LI, are mandatory in some jurisdictions. The below arrangement provides a solution to this problem.

The platform 700 is connected via an S1 interface to the core network, which comprises a gateway 2020 (e.g. enhanced GGSN/P-GW/SAE-GW) and a packet buffer/function 2040. The gateway 2020 facilitates the provision of core network functions 2055, such as content filtering and LI, by LI function 2060, content filtering by content filtering function 2065, and charging, by charging function 2070.

The gateway 2020 receives content from a primary content source 2030, typically via the Internet. The primary content is delivered from the primary content source 2030 via Gi LAN 2050. This content may be received by the packet buffer/function 2040 before delivery to the gateway 2020.

Due to mandatory functions which are only located in the core like Lawful interception, Charging, Policy control, etc. it is required that all the content delivered to a user needs to pass the core network first In this case the content will be requested from the primary content source (internet or from the central Gi Cache or CDN) 2030 and routed via the gateway (e.g. GGSN, SAE-GW) 2020 to the mobile device 10.

This method uses the standard data flows and will be no improvement in the delivery rate of content located in the RAN (at the cache 1100) to the user because the content cannot be delivered until the content has been obtained and processed by the core network.

Therefore time to deliver content to a user still depends on the time the content passes the different network nodes. Before the content could be delivered it is needed to fulfil mandatory functions in the core network like e.g. LI. The effective time to deliver the content cached at the SAVi (e)NodeB will be faster when cached also in the Gi but the flows will still be the same.

The embodiment now to be described seeks to provide faster delivery of locally cached content to a user.

In the method of providing core network services, access to network data is provided to existing core network services by sending also uplink data (e.g. request) from terminal devices 10 to the core network that would normally be kept in the network edge. The uplink data is repeated towards the core network to be processed as if no network edge intelligence is available, and dropping the downlink network data in the core network.

In this embodiment, uplink data (e.g. a request) from a client device 10 (e.g. mobile handset) is received and processed by a platform 700 at the edge of the network (e.g., LTE eNode-B 2003, 3G Flat Node-B, RNC), and any associated downlink data (e.g. a response) is delivered directly to the client UE 10, whilst also sending the original content request uplink towards the core network (e.g. gateway—SP-GW, GGSN or SGSN—2020). Therefore the standard UL Packet gets served by the gateway (e.g. SAE-GW) 2020 regarding e.g. LI and charging. Also a specific marked packet by e.g. the caching function 1100 (e.g. an ID in the GTP Option header field) will be sent in the uplink. The so marked packet will be identified by the gateway (e.g. SAE-GW 2020) and due to the marking it will be routed to the SAVi Packet Buffer Proxy 2040. Therefore the solution can occur with minimum modification (fast caching content marking and rerouting to the SAVi Packet Buffer Proxy 2040).

Instead of sending any subsequent downlink data again to the client device 10 at the edge of the network (which has already received local downlink data from the cache 1100), it is dropped by the SAVi Packet Buffer Proxy 2040 after network services (e.g. LI and/or charging) have performed their normal function.

This embodiment is particularly suitable where content filtering is not required to be performed by the core network before content is delivered to a user's terminal. For example, the user might not require content filtering—such as if the user is an adult, they may not require adult content filtering. The embodiment may be used only with content that does not require content filtering—such as content identified as non-adult material. The embodiment may implement content filtering at the SAVi platform 700 (e.g. by a content filter client), rather than (or in addition to) content filtering performed by the core network. The reason for this is that in the embodiment, the content may be delivered to the user before the core network services (such as content filtering are performed).

In this embodiment the SAVi Packet Buffer Proxy 2040 in the Gi LAN 2050 should be located close to the gateway (e.g. GGSN/PGW/SAE-GW) 2020 (e.g. a virtual machine in the mobile packet core). All traffic is terminated in the proposed architecture on the gateway (e.g. enhanced GGSN 2020). Due to this all the functions in the Gi LAN 2050 and the ones on the gateway (e.g. GGSN) 2020 may be reused.

The solution/architecture of this embodiment shows that the content could be directly delivered from the SAVi platform 700 to the UE 10, and provides many advantages. The solution therefore gives a network operator the capability to fulfil the legal requirements and also various Core Network and Gi LAN related functions.

An example of the signalling between network elements will now be described with reference to FIG. 14. The mechanism allows core network services such as LI and charging to be performed for local served content in the cache 1100 at the SAVi access network edge. UE 10 Uplink data requests are handled by the Cache 1100 towards the Core, where the cached data flow is adopted from/emulated by the Internet/SAVi primary content source 2030 towards the gateway (e.g. SAE Gateway) 2020.

Figure 14:
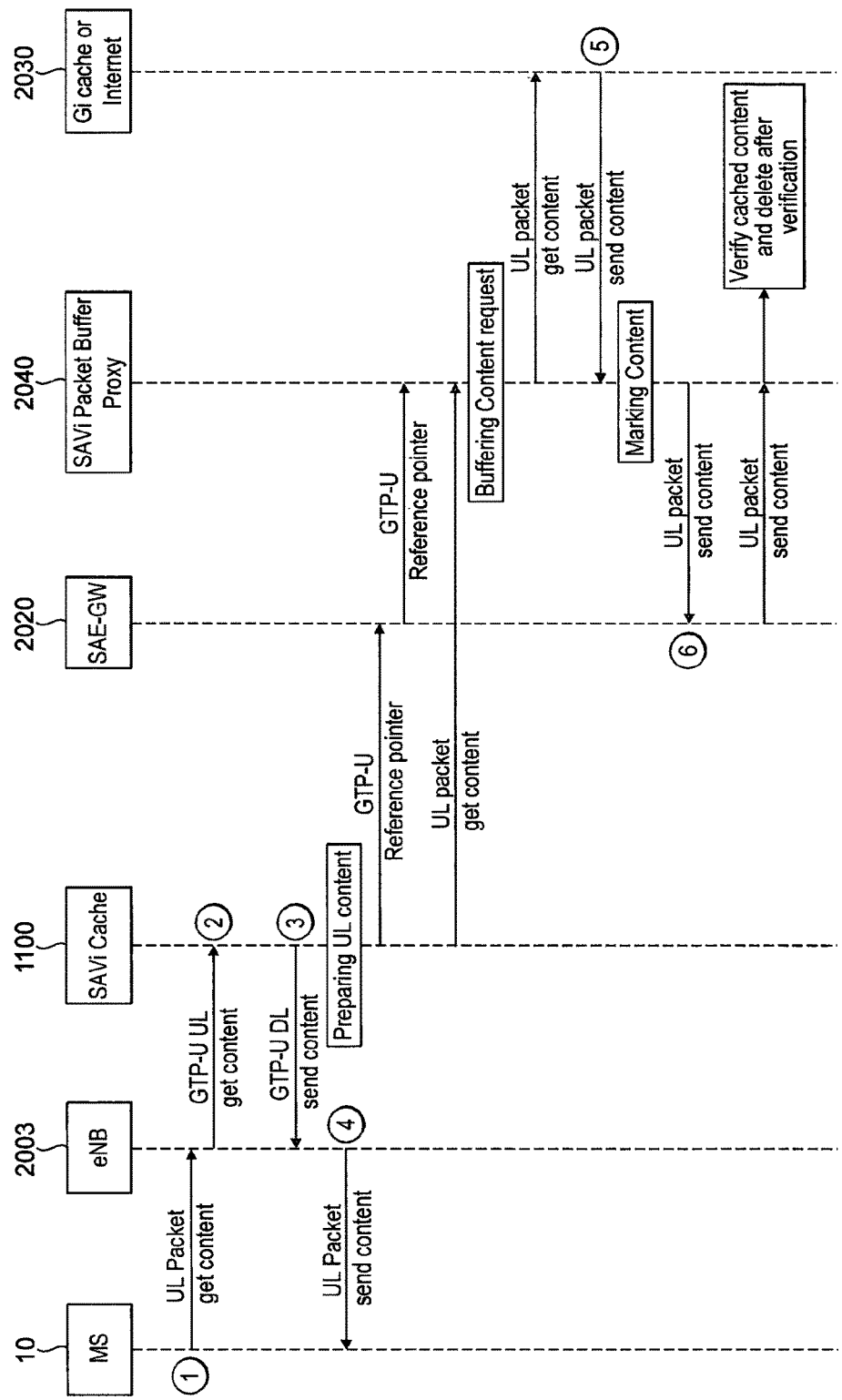
FIG. 14 shows the steps performed and the signal flows in accordance with a first embodiment of the invention.
Figure 15:
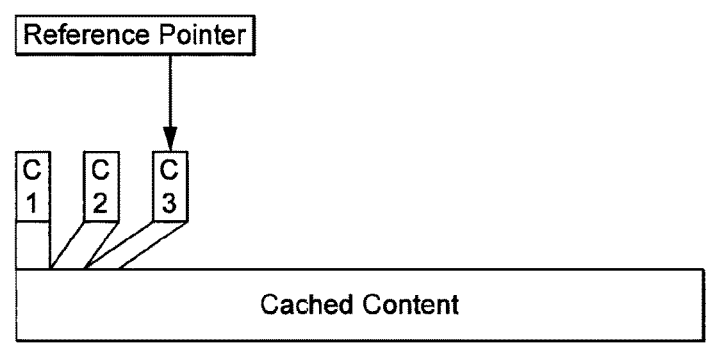
FIG. 15 shows a reference pointer in accordance with the first embodiment of the invention.

The following steps shown in FIG. 14 outline the signal flow:

1. User 10 requests content located in the Internet or cached in the Gi (e.g. from Primary Content source (e.g. Web Server) 2030). In this case it is assumed that the content is also locally cached at SAVi Platform 700 cache 1100. In case of sending the request directly to the gateway (e.g. SAE-GW, GGSN) 2020 the request will be sent first to the Cache 1100. In more detail, the UE 10 requests content by issuing an uplink packet content request message, which is transmitted to the eNodeB 2003 at the platform 700 with which the UE 10 is currently registered and in connected mode. The eNodeB 2003 then forwards the content request in a GPRS Tunnelling Protocol (GTP-u) message to the cache 1100.
2. The Cache 1100 sees (as user traffic has to pass SAVi Platform 700) that this is a HTTP content request. By communication with the SAVi Platform 700, the cache 1100 is made aware that the user has an "adult" subscription and therefore does not require adult content filtering. Therefore the request to the Cache application 1100 located on the SAVi Platform 700 could be executed.
3. As the content is already stored on the Caching application 1100 the application 1100 delivers the content in a downlink (DL) packet GTP-u message to the eNB 2003.
4. The GTP-U DL packet gets sent via the eNodeB 2003, from where the content is delivered to the UE 10. The content is delivered immediately to the UE 10 from the local cache 1100 without delay (without waiting for any relevant core network functions to be completed). This improves the user experience. The Caching application 1100 creates a reference pointer and sends this via the gateway (e.g. SAE-GW 2020) to the SAVi Packet Buffer Proxy 2040. Details of the reference pointer are shown in FIG. 15. In parallel the request will be sent to the primary content source (e.g. internet or the central caching application or Web Server) 2030. Therefore also the uplink content could be served by the gateway 2020 (e.g. SAE-GW) e.g. for LI, or charging. The content is requested from the primary content source (e.g. Internet or Cache at Gi/Primary Content Web Server) 2030.
5. The content will be sent by the primary content source (e.g. central cache or Primary Content Web Server) 2030 back to the SAVi Packet Buffer Proxy 2040. As the SAVi Packet Buffer Proxy 2040 has buffered the request it marks the response and sends it to the gateway (e.g. SAE-GW, GGSN) 2020. Therefore the SAVi Packet Buffer Proxy 2040 has also the capability to verify with the reference pointer and the content if the content has already been delivered to the UE 10.
6. The gateway (e.g. SAE-GW, GGSN) 2020 receives the content and handles in the defined way to manage LI, charging, policy management etc. As the content is marked the gateway (e.g. SAE-GW) 2020 will pass the content to the SAVi Packet Buffer Proxy 2040. As the SAVi Packet Buffer Proxy 2040 exactly knows which content has been transmitted to the UE using information from the received reference pointer it will delete all the content that was already transmitted to the user from the cache 1100. To do this in a way that it is acceptable for the LI authorities the reference pointer is important as is discussed in the following.

This action reduces use of last mile transport link capacity. In this way, a copy of each of the downlink packets provided to the UE 10 is made available at the gateway (e.g. SAE gateway) 2020 so that core network functions can be applied to the data packet. As indicated, such core network functions may be LI functions, performed by LI module 2060 and/or charging functions performed by charging module 2070. Thus, the core network functions are performed on downlink data that is a copy of the downlink data provided to the UE 10 from the cache 1100. After the core network functions have been applied to the copy downlink data, the downlink data is no longer required (as it has already been provided to the UE 10 directly from the cache 1100), and the downlink data can then be discarded by the SAVi Packet Buffer Proxy 2040—there is no requirement for it to be forwarded through the network to the mobile terminal 10 as this downlink data has already been provided to the UE 10 directly from the cache 1100.

Reference Pointer

As mentioned above the reference pointer, created by the cache 1100 application, will be delivered between cache 1100 application and SAVi Packet Buffer Proxy 2040. The reference pointer will be responsible to indicate the exact content delivered to the user.

As shown in FIG. 15 there is the need that the Reference Pointer reports the exact amount of content delivered to the end user and the nature/identity of the content. The reference pointer is important for LI to make sure that the content delivered to the user 10 could be handled in the most efficient way. Therefore additional information should be added like e.g. APN, IP addresses, bearer, etc. A final list of information part of the Reference Pointer may be agreed with the legal authorities. The reference pointer enables the delivery of the local content directly to the UE 10 from the cache 1100 application.

The exchange of the Reference Pointer could be done e.g. per packet or only when the user or the system stops the transmission based on legal requirements (e.g. so that the start end of the content are identified).

However, the final implementation of the reference pointer also depends on the content or the requirements of the MNO (Mobile Network Operator) or LEA (Law Enforcement Agency). As mentioned above the e.g. full content of a movie or software update of an operating system located at the cache 1100 application could be sliced in different containers (C1, C2, C3, . . . ). In this case the container size could differ from e.g. one TCP packet, the amount of packets of a TCP acknowledge window, or any acceptable size to the MNO or LEA. See FIG. 15.

This can ensure that generally only the content of a container will be delivered to the LEA or charging system which has been sent to the customer. E.g. if a C1 is successfully delivered the reference pointer will be sent to SAVi Packet Buffer Proxy 2040. If C2 fails (is not successfully delivered) then the reference pointer of that container will be sent out but C3 will not be sent to SAVi Packet Buffer Proxy 2040 before C2 has been successfully delivered as C3 has to wait for C2 to be successfully delivered. Therefore the SAVi Packet Buffer Proxy 2040 could temporarily store the content from the primary content source (e.g. Internet or the Gi Cache) 2030 when not delivered already to the UE 10.

The size of the cached content on the SAVi NodeB 2003 and the content in the Internet or in the primary content source (e.g. Gi cache) 2030 are the same. Further the container size must also be the same.

Therefore the maximum size of one container could be delivered to the gateway (e.g. SAE-GW) 2020 in case of a failure of the connection between the UE and the eNodeB 2003.

Other use cases not shown in the flow of FIG. 14
Some exceptions are discussed in the following.
General Flow
1. User 10 requests content which is also stored at the SAVi cache 1100
2. The Time to Live from the content is valid (Cached content has an indication how long it could be cached and when the cached content is too old its "Time to Live" becomes invalid).
   a. The transparent cache application 1100 starts to deliver the content to the user 10.
   b. In parallel the cache 1100 sends a reference pointer to the SAVi Packet Buffer Proxy 2040 and at the same time the Cache 1100 sends the content request to the primary content source (e.g. Primary Content Web Server or internet location) 2030 of that content.
   c. The content owner platform (or the central Gi cache) starts sending back the content.
   d. The gateway (e.g. SAE-GW, GGSN) 2020 receives the content and sends it to the SAVi Packet Buffer Proxy 2040 after all mandatory functions and services have seen the content.
   e. After this the content will be routed to the SAVi Packet Buffer Proxy 2040 which deletes the content based on the reference pointer it got from Cache 1100.
User Stops the Request
3. User 10 stops the request. This will be signalled to the caching application 1100 which will stop sending and creates a Reference pointer.
4. Cache 1100 sends the cancel request and the Reference pointer to the SAVi Packet Buffer Proxy 2040
   a. SAVi Packet Buffer Proxy 2040 will send the cancel request based on the Reference pointer information available to make sure that content owner's platform or Gi cache stops sending at the same time the caching application stops sending. Further it does not deliver any further content to the gateway (e.g. SAE-GW) 2020.
   b. Therefore the same content reaches the gateway (e.g. SAE-GW, GGSN) 2020 to fulfil functions like e.g. LI, Policy or ACF and SAVi Packet Buffer Proxy 2040 will delete the content.

Content is not available anymore on the Gi Cache or in the primary content source (e.g. Primary Content Web Server or Internet) 2030
5. As the cache 1100 at the SAVi Node 700 sends the content to the user 10 without delay it has to be considered that the content is not available anymore from the primary content source (e.g. Gi cache Internet) 2030. However, as the Time to Live from the content was still valid it is expected that this is sufficient for the LI and the content could be delivered to the end user
   a. If an error message from the content owner comes back that the content is not available any more, the SAVi Packet Buffer Proxy 2040 sends immediate a message to the Cache 1100 to stop sending the content.
   b. Cache 1100 stops sending to the user 10 and will not allow that anyone else could receive the content
      i. In case needed the Cache 1100 could send the Reference pointer and the content back to the SAE-GW. With proposal also mandatory legal functions like e.g. LI could be managed
   c. This should be an exception as the Time to Live was still valid Summary of FIG. 14 Embodiment The proposed solution/architecture shows that the SAVi Packet Buffer Proxy 2040 located close to the gateway (e.g. SAE-GW, GGSN) 2020 and the corresponding function Cache 1100 on the SAVi Platform 700 (RAN) allows improving the quality of experience regarding caching.

With this scenario it is possible to deliver the content immediately from the RAN cache 1100 to the customer UE 10 while knowing exactly the amount of content sent to the customer.

This arrangement may have the following advantages:
Low latency for edge content delivery.
Low system impact, with the re-use of existing LI systems.
Fulfils LI detection mitigation requirements.
Reduces last mile transport capacity in the downlink transmission.

General GGSN/PGW Functions

The gateway (e.g. SAE-GW GGSN) 2020 needs to have the function to route marked DL content to the SAVi Packet Buffer Proxy 2040. All functions listed below may be supported as these functions will not be affected.
GTP/PDP handling in case of PDP context inactivity
Other functions may work without any limitation, such as:
IP Address registration from GGSN/P-GW pool (NAT44, Firewalls, . . . )
Core pooling
Evolution story towards LTE
Different APN handling:

Registration e.g. on HLR/HSS per service (how to make sure that a customer does not get access to services booked.

HTTP header enrichment & encryption

Content Filtering or Adult Content Filter

As the flow is passing the gateway (e.g. GGSN) 2020 all the content will touch all the Gi LAN 2050 and gateway (e.g. GGSN) 2020 functions and therefore also all core network filter functions may be supported without any change. However, the Cache 1100 needs to know that a specific content can be delivered to the UE 10. Therefore the content under Adult Filter should be marked, and should not send to the user 10.

Charging

As all content which is cached or stored in a primary content source (e.g. Cache) 2030 will pass all Gi LAN 2050 and GGSN 2020 functions, the charging for this content can be performed in the conventional manner using core network functions.

Further it is needed if a user only downloads part of the cached content 1100 and not all of it to get an indication about the amount of data transmitted to UE 10. Here the SAVi Platform 700 obtains delivery time and amount of data delivered as a minimum. Further information which may be obtained might include, e.g., if a download of content is free of charge for the customer, such as free Facebook access.

Online Charging

Offline Charging

Service based Charging (packet inspection)

If a customer has exceeded his monthly amount of data and further data transmission needs to be throttled it is recommended that the customer will only be served from the Core Network (i.e. content will not be provided by the cache 1100). Reason would be the limited capacity on the SAVi platform 700 regarding processing power and memory. Due to this also an indicator is provided when someone should not be served by the SAVi platform 700 at all.

Fair usage policy

PCC (Policy and Charging Control)

The listed requirements below should be supported in the Core Network currently due to the limited capabilities on the SAVi platform 700. Therefore the SAVi Platform 700 advantageously obtains the information about such customer classifications and reacts.

Policy enforcement (policing, shaping, DSCP marking, Customer classes Gold/Silver/Bronze etc.)

Heuristic classification (VoIP—P2P etc.)

Traffic steering—redirection

Mobility, Seamless Service Mobility

In case of UE 10 mobility the gateway (e.g. GGSN/PGW) 2020 receives information that a user is requesting content from a different (e)NodeB (with or without SAVi). Further the SAVi Packet Buffer Proxy 2040 knows the content downloaded from the cache at a SAVi NodeB 700. The source eNB controls handover, and SAE GW oversees the path switch. This may be performed in the following scenarios:

SAVi node to SAVi node or SAVi node to non SAVi node Content stored in SAVi node and content not stored on SAVi node.

Different radio technologies (3G/4G/WLAN)

Subscriber mobility state or other attributes known by the core

Detailed Mobility Scenarios are Described Later.

Optimisation and Other Gi LAN Relevant Functions

It is expected that all optimisations are handled in the core and therefore no impact is expected. This is also likely as the LI must generally be fulfilled on the content shared with customer. LI is done in the Core and therefore optimisation needs to be there for the time being.

Content optimisation may relate to Video or Web content.

The solution/architecture of this embodiment shows that the SAVi Packet Buffer Proxy 2040 located close to the gateway (e.g. GGSN/PGW) 2020 and placing a Caching 1100 on the SAVi platform 700 fulfils provides many advantages. The solution therefore gives an operator the capability to fulfil the legal requirements and also various Core Network and Gi LAN related functions.

REFERENCES

The content of the following documents is fully incorporated herein by reference:

3GPP TS 33.106, 3G security; Lawful Interception requirements

3GPP TS 33.107, 3G security; Lawful interception architecture and functions

3GPP TS 33.108, 3G security; Handover interface for Lawful Interception (LI)

3GPP TS 36.423, E-UTRAN; X2 application protocol (X2AP)

3GPP TS 36.300, E-UTRAN; E-UTRA Overall description; Stage 2

RFC 1072

RFC 2018

The invention claimed is:

1. A mobile telecommunications network comprising:
a core network having content processing means operable to provide a core network service relating to content, and
a radio access network having radio means for wireless communication with a terminal registered with the telecommunications network, wherein the radio access network includes a local source of content,
wherein the telecommunications network is arranged to:
deliver content from the local source of content to the terminal,
generate an indication identifying the content delivered from the local source to the terminal, the indication including a reference pointer that identifies a delivery amount of the content and a nature of the content;
send to the core network the indication of the content delivered from the local source of content to the terminal,
in parallel with sending the indication to the core network, additionally send the indication to a primary content source that is different from the core network, wherein the primary content source includes second content that is generally identical to the content delivered from the local source of content to the terminal,
obtain the second content from the primary content source in response to the indication being sent to the primary content source, and
provide the second content to the core network service, wherein the content is sent from the local source of content to the terminal before the second content is provided to the core network service.

2. The telecommunications network of claim 1, wherein, as a result of the core network obtaining the second content, both the radio access network and the core network include generally identical content without the generally identical content being transmitted between the core network and the radio access network at a time when the second content is obtained.

3. The telecommunications network of claim 1, wherein the core network is operable to discard the second content after the core network service performs an operation on the second content.

4. The telecommunications network of claim 1, wherein the radio access network provides the content from the local source to the terminal in response to a request for that content.

5. The telecommunications network of claim 1, wherein the telecommunications network determines whether a user of the terminal requires content filtering.

6. The telecommunications network of claim 1, wherein the telecommunications network is further configured to:
deliver the content from the local source of content to the terminal as a content item comprising a plurality of packets, and wherein the indication sent to the core network includes a particular indication associated with the content item.

7. The telecommunications network of claim 6, wherein the particular indication enables the second content to be identified and retrieved from the primary content source.

8. A method of operating a mobile telecommunications network including a core network having content processing means operable to provide a core network service relating to content, and a radio access network having radio means for wireless communication with a terminal registered with the telecommunications network, wherein the radio access network includes a local source of content, the method comprising:
delivering content from the local source of content to the terminal,
generating an indication identifying the content delivered from the local source to the terminal, the indication including a reference pointer that identifies a delivery amount of the content and a nature of the content;
sending to the core network the indication of the content delivered from the local source of content to the terminal,
in parallel with sending the indication to the core network, additionally sending the indication to a primary content source that is different from the core network, wherein the primary content source includes second content that is generally identical to the content delivered from the local source of content to the terminal,
obtaining the second content from the primary content source in response to the indication being sent to the primary content source, and
providing the second content to the core network service, wherein the content is sent from the local source of content to the terminal before the second content is provided to the core network service.

9. The method of claim 8, wherein, as a result of the core network obtaining the second content, both the radio access network and the core network include generally identical content without the generally identical content being transmitted between the core network and the radio access network at a time when the second content is obtained.

10. The method of claim 8, wherein the core network discards the second content after the core network service performs an operation on the second content.

11. The method of claim 8, wherein the radio access network provides the content from the local source to the terminal in response to a request for that content.

12. The method of claim 8, wherein the method further includes determining whether a user of the terminal requires content filtering.

13. The method of claim 8, wherein the method further includes:
delivering the content from the local source of content to the terminal as a content item comprising a plurality of packets, and wherein the indication sent to the core network includes a particular indication associated with the content item.

14. The method of claim 13, herein the particular indication enables the second content to be identified and retrieved from the primary content source.

* * * * *